United States Patent
Chen et al.

(10) Patent No.: US 8,430,420 B2
(45) Date of Patent: Apr. 30, 2013

(54) SECURITY DEVICE AND CHILD STROLLER

(75) Inventors: Shun-Min Chen, Central (HK);
Zong-Wang Cui, Central (HK)

(73) Assignee: Wonderland Nurserygoods Company Limited, Central (HK)

( * ) Notice: Subject to any disclaimer, the term of this patent is extended or adjusted under 35 U.S.C. 154(b) by 183 days.

(21) Appl. No.: 13/155,400

(22) Filed: Jun. 8, 2011

(65) Prior Publication Data
US 2011/0304124 A1 Dec. 15, 2011

Related U.S. Application Data

(60) Provisional application No. 61/354,254, filed on Jun. 14, 2010.

(51) Int. Cl.
*B62B 9/24* (2006.01)

(52) U.S. Cl.
USPC .......................................... 280/647; 280/658

(58) Field of Classification Search .................. 280/639, 280/642, 643, 647, 648, 649, 650, 657, 658, 280/47.38, 47.4
See application file for complete search history.

(56) References Cited

U.S. PATENT DOCUMENTS

| | | | | |
|---|---|---|---|---|
| 2,751,232 A * | 6/1956 | Sundberg | | 280/644 |
| 4,605,243 A * | 8/1986 | Glaser | | 280/642 |
| 5,106,116 A | 4/1992 | Chen | | |
| 5,624,152 A * | 4/1997 | Yoshie et al. | | 297/184.13 |
| 5,709,400 A * | 1/1998 | Bonnier et al. | | 280/650 |
| 6,802,514 B2 * | 10/2004 | Worth et al. | | 280/30 |
| 7,188,858 B2 * | 3/2007 | Hartenstine et al. | | 280/642 |
| 7,717,457 B2 * | 5/2010 | Bearup et al. | | 280/647 |
| 2007/0262565 A1 * | 11/2007 | Bearup et al. | | 280/642 |
| 2008/0211206 A1 * | 9/2008 | Thorne et al. | | 280/650 |

FOREIGN PATENT DOCUMENTS

| | | |
|---|---|---|
| CN | 2690256 Y | 4/2005 |
| WO | 2007134282 A2 | 11/2007 |
| WO | 2007134282 A3 | 11/2007 |

* cited by examiner

*Primary Examiner* — Frank Vanaman
(74) *Attorney, Agent, or Firm* — Winston Hsu; Scott Margo

(57) ABSTRACT

A security device for preventing unexpected folding and a child stroller therewith are disclosed. The security device uses a seat-plate locking part disposed on a seat plate to allow or constrain the folding of a rear leg assembly and a front leg assembly of the child stroller according to whether a child is sitting on the seat plate. When a child is sitting on the seat plate, the folding of the child stroller cannot be performed even though a frame positioning device is unlocked. Therefore, the invention can prevent a child sitting on the seat plate of the child stroller from getting hurt due to an unexpected folding of the child stroller.

27 Claims, 26 Drawing Sheets

SECURITY DEVICE AND CHILD STROLLER

CROSS REFERENCE TO RELATED APPLICATIONS

This application claims the benefit of U.S. Provisional Application No. 61/354,254, which was filed on Jun. 14, 2010 and is incorporated herein by reference.

BACKGROUND OF THE INVENTION

1. Field of the Invention

The invention relates to a child stroller, and especially relates to a security device for preventing the child stroller from being unexpectedly folded.

2. Description of the Prior Art

The present child stroller includes a stroller frame, a front-wheel assembly disposed at a front bottom portion of the stroller frame, and a rear-wheel assembly disposed at a rear bottom portion of the stroller frame. The stroller frame includes a locking mechanism for locking the stroller frame. The present child stroller lacks a security mechanism for preventing an unexpected folding when a child is sitting on the stroller. Therefore, when a child is sitting on the child stroller, there may be a safety concern regarding the possibility that the stroller frame may be folded unexpectedly.

SUMMARY OF THE INVENTION

An objective of the invention is to provide a security device for preventing unexpected folding. The security device allows or constrains the folding of a child stroller therewith according to whether a child is sitting on the child stroller, so as to avoid the danger due to any unexpected folding to the child on the child stroller.

The security device of the invention is used in a child stroller. The child stroller includes a side support assembly, a rear leg assembly, a frame positioning device, a front leg assembly, and a chair assembly. The rear leg assembly and the side support assembly are pivotally connected by the frame positioning device. The front leg assembly and the rear leg assembly are pivotally connected. The chair assembly includes a seat tube and a seat plate. The seat tube is mounted on the frame positioning device. The security device includes a sleeve, a seat-plate locking part, and an elastic restore part. The sleeve is sleeved on the seat tube in a slidable way and is pivotally connected to the front leg assembly. The sleeve has a first hole. The seat tube has a second hole. When the child stroller is unfolded, the first hole is substantially aligning with the second hole. The seat-plate locking part is movably disposed on the seat plate. The seat-plate locking part has an end portion. The elastic restore part is connected to the seat-plate locking part. When the first hole is substantially aligning with the second hole and the seat plate is weighted, the end portion is engaged in the first hole and the second hole simultaneously to constrain the sleeve and the seat tube from moving relatively; when the seat plate is un-weighted, the elastic restore part drives the seat-plate locking part to disengage the end portion from the second hole such that the sleeve is capable of moving relatively to the seat tube.

Therefore, when a child is sitting on the child stroller, the security device of the invention can prevent the folding of the child stroller so as to avoid hurt to the child.

Another objective of the invention is to provide a child stroller including the security device of the invention. The child stroller uses the security device to prevent the folding of the child stroller when a child is sitting on the child stroller, which solves the problem that the child stroller in the prior art can be folded no matter whether a child is sitting on the child stroller, leading to hurt to the child.

The child stroller of the invention includes a side support assembly, a rear leg assembly, a frame positioning device, a front leg assembly, a chair assembly, and a security device, i.e. the security device of the invention, which is not described herein. The rear leg assembly and the side support assembly are pivotally connected by the frame positioning device. The front leg assembly and the rear leg assembly are pivotally connected. The chair assembly includes a seat tube and a seat plate. The seat tube is mounted on the frame positioning device. Similarly, when a child is sitting on the child stroller, the security device of the invention can prevent the folding of the child stroller so as to avoid hurt to the child.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
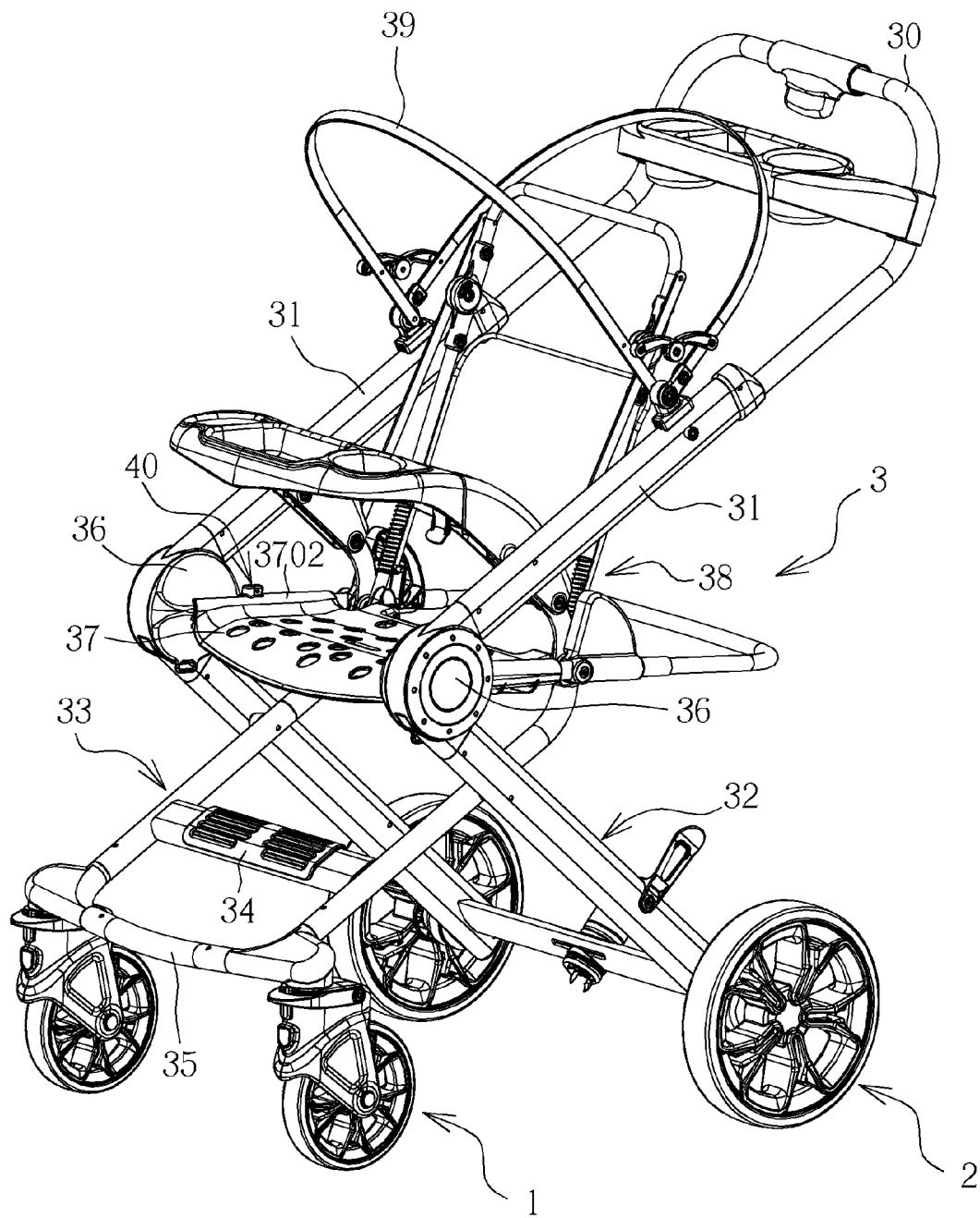
FIG. 1 is a perspective schematic diagram of a child stroller of a preferred embodiment according to the invention.

Please refer to FIG. 1, which is a perspective schematic diagram of a child stroller of a preferred embodiment according to the invention. As shown in FIG. 1, the child stroller of the invention includes a front-wheel assembly 1, a rear-wheel assembly 2, and a stroller frame 3. The stroller frame 3 includes a handle assembly 30, a side support assembly 31 sleeved with the handle assembly 30, two frame positioning devices 36, a rear leg assembly 32 pivotally connected to the side support assembly 31 by the frame positioning devices 36, a front leg assembly 33 pivotally connected to and intersected with the rear leg assembly 32, a front cross bar 34 and a front-leg connecting bar 35 respectively connecting two sides of the front leg assembly 33, a chair assembly 37 inside and between the frame positioning devices 36, a backrest assembly 38 connected to the chair assembly 37, a canopy assembly 39 mounted on the side support assembly 31, and two security devices 40 (one of the security devices 40 is shaded by one of the frame positioning devices 36 and therefore is neither shown or indicated). The front-wheel assembly 1 is connected to the front-leg connecting bar 35. The rear-wheel assembly 2 is connected to the rear leg assembly 32. It is added that, for a clear illustration of the structure of the stroller frame 3, the cloth of the canopy assembly 39 and the sheath cloth of the backrest assembly 38 are omitted.

Figure 2:
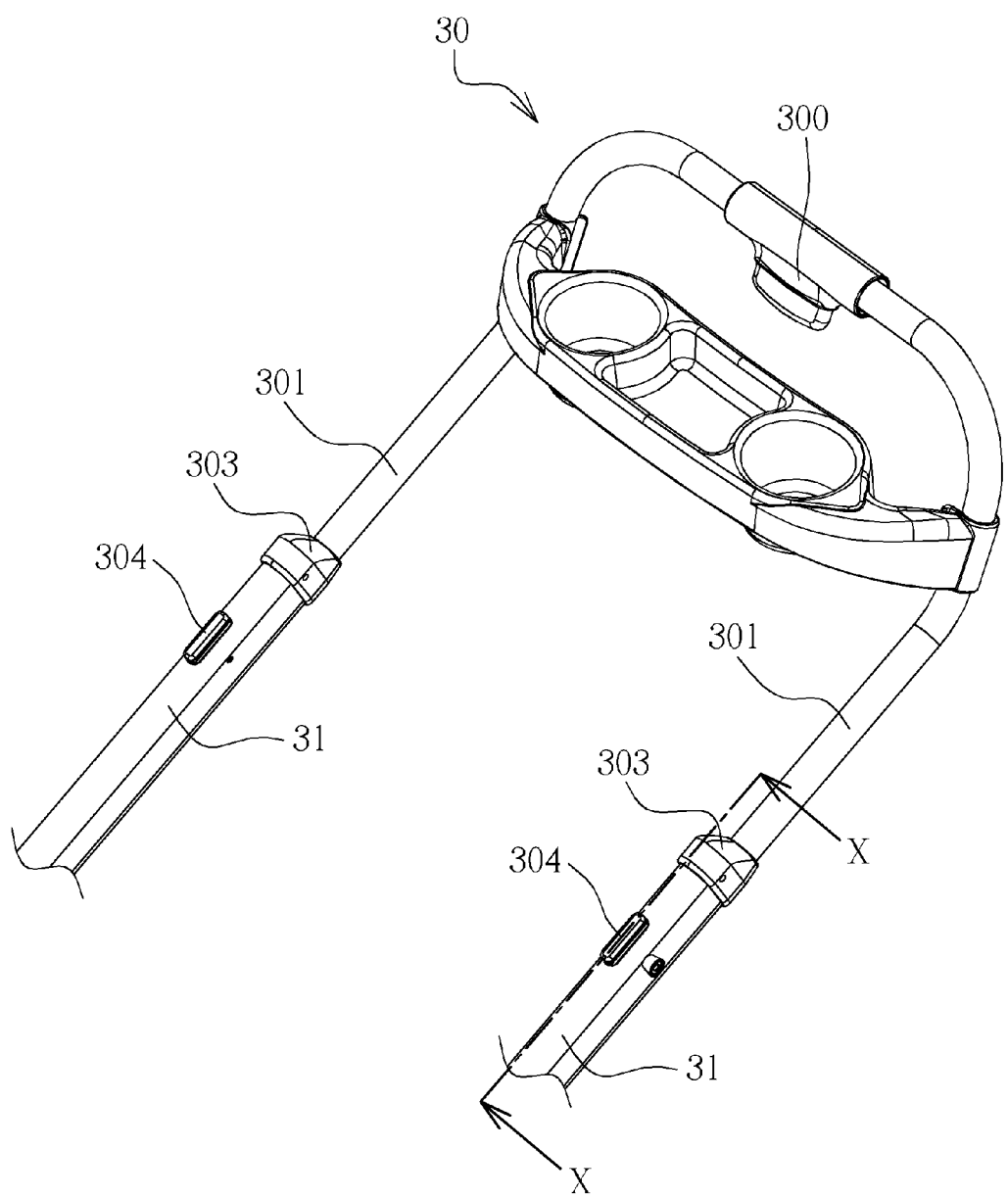
FIG. 2 is a partial perspective schematic diagram of the handle assembly in FIG. 1.
Figure 3:
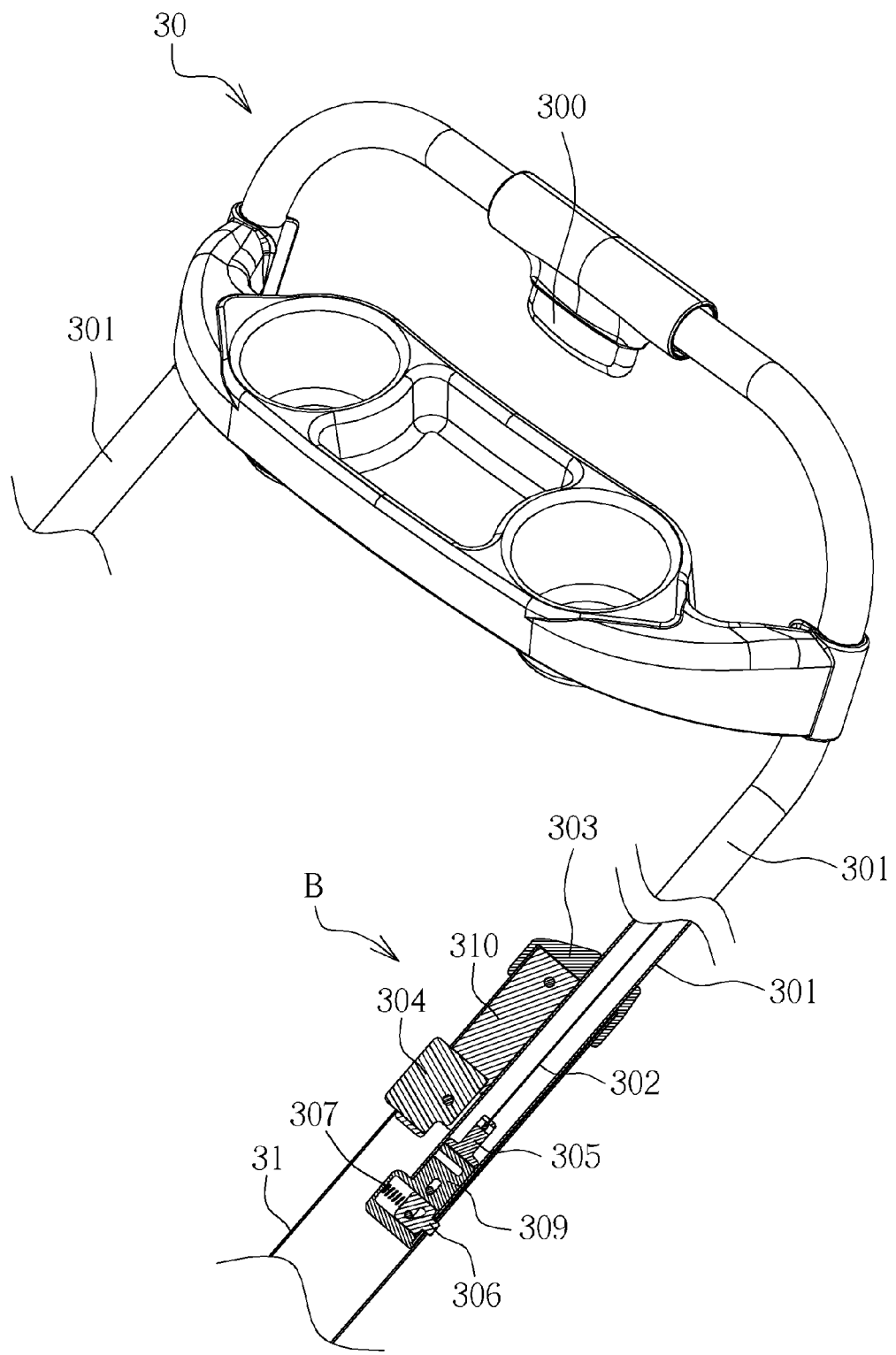
FIG. 3 is a sectional view of the handle assembly along the line X-X in FIG. 2.
Figure 4:
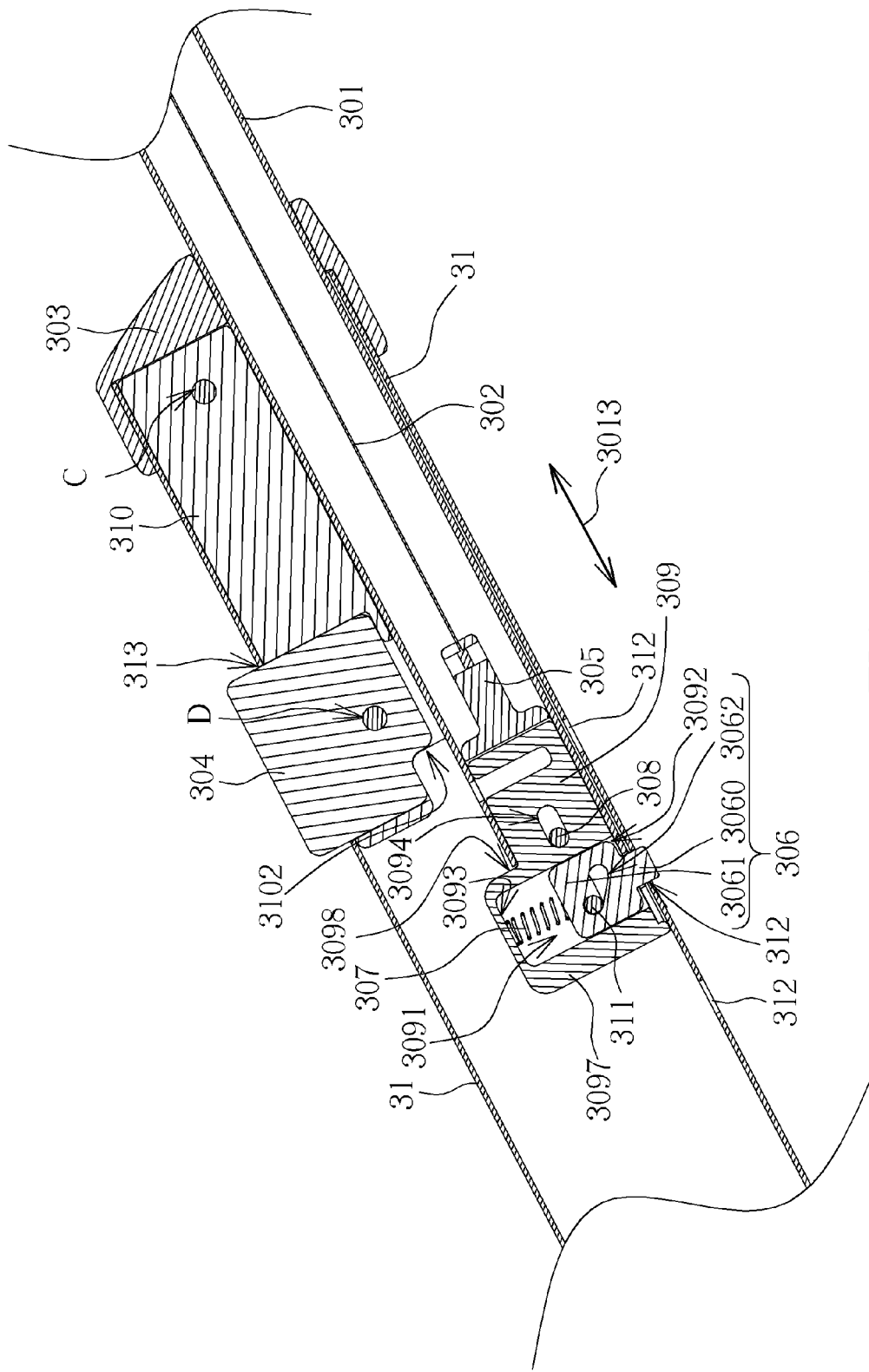
FIG. 4 is an enlarged view of the portion indicated by a label B in FIG. 3.
Figure 5:
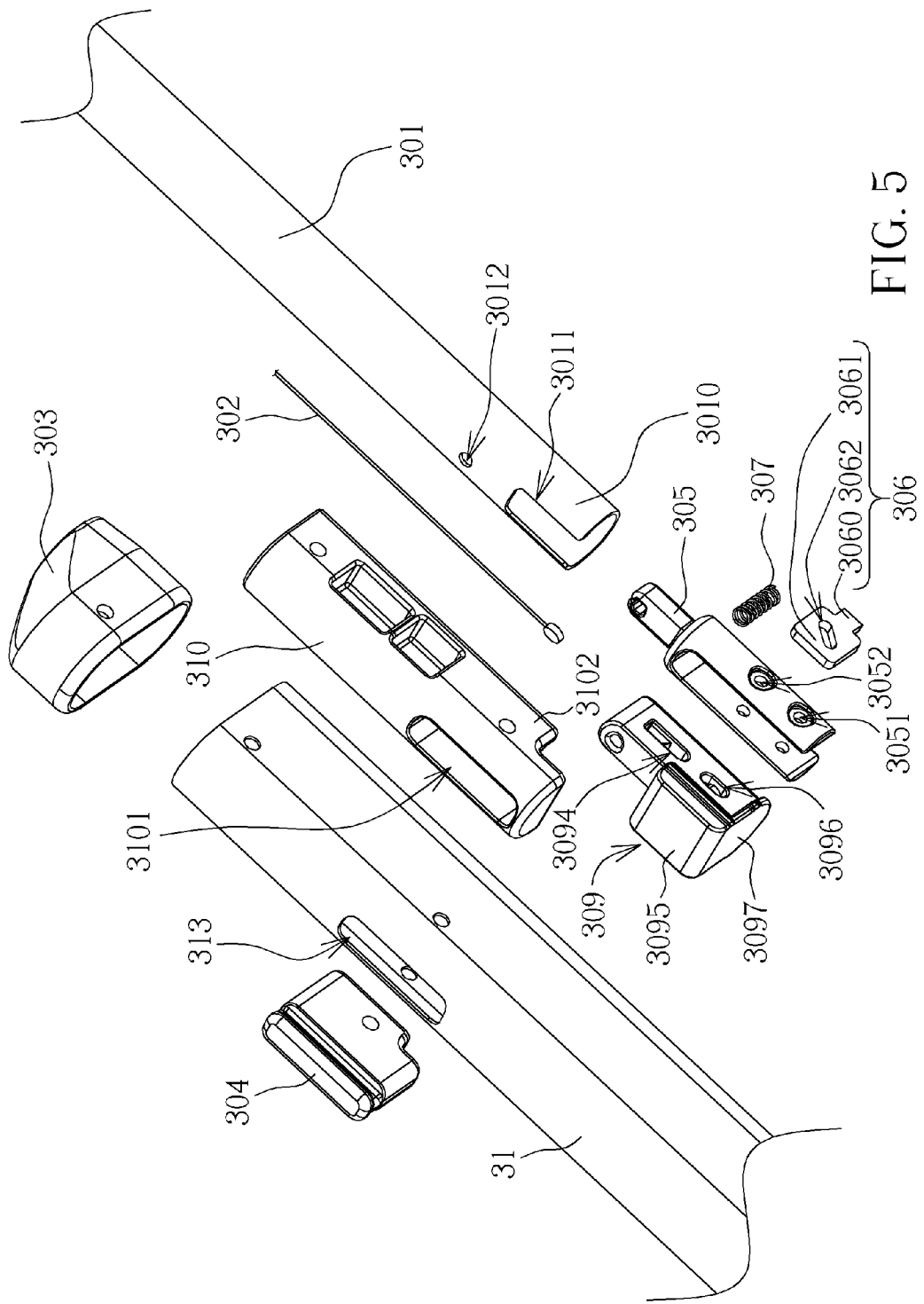
FIG. 5 is an exploded diagram of the retraction mechanism in FIG. 4 for the handle tube.
Figure 6:
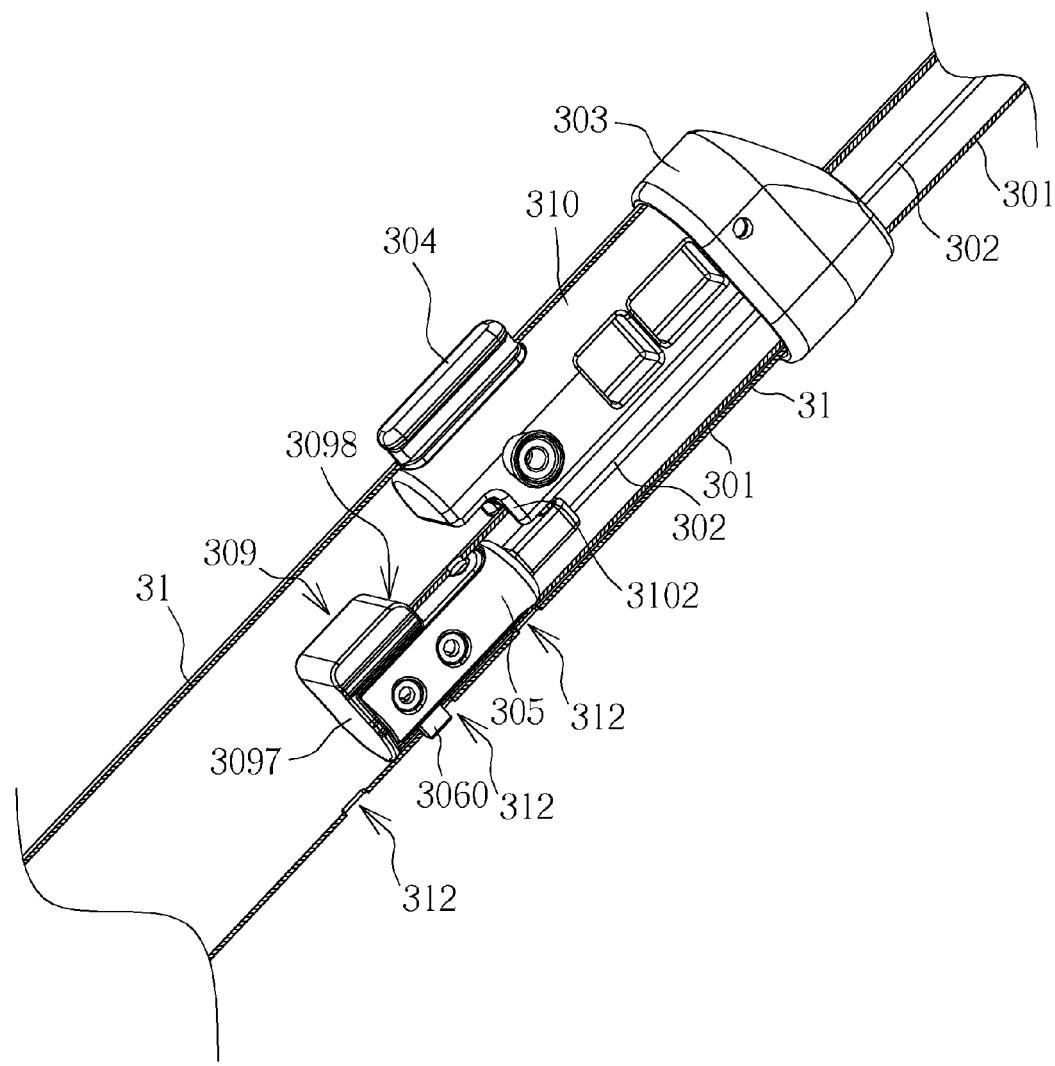
FIG. 6 and FIG. 7 are internal assembly diagrams respectively in different views illustrating the retraction mechanism in FIG. 4.
Figure 7:
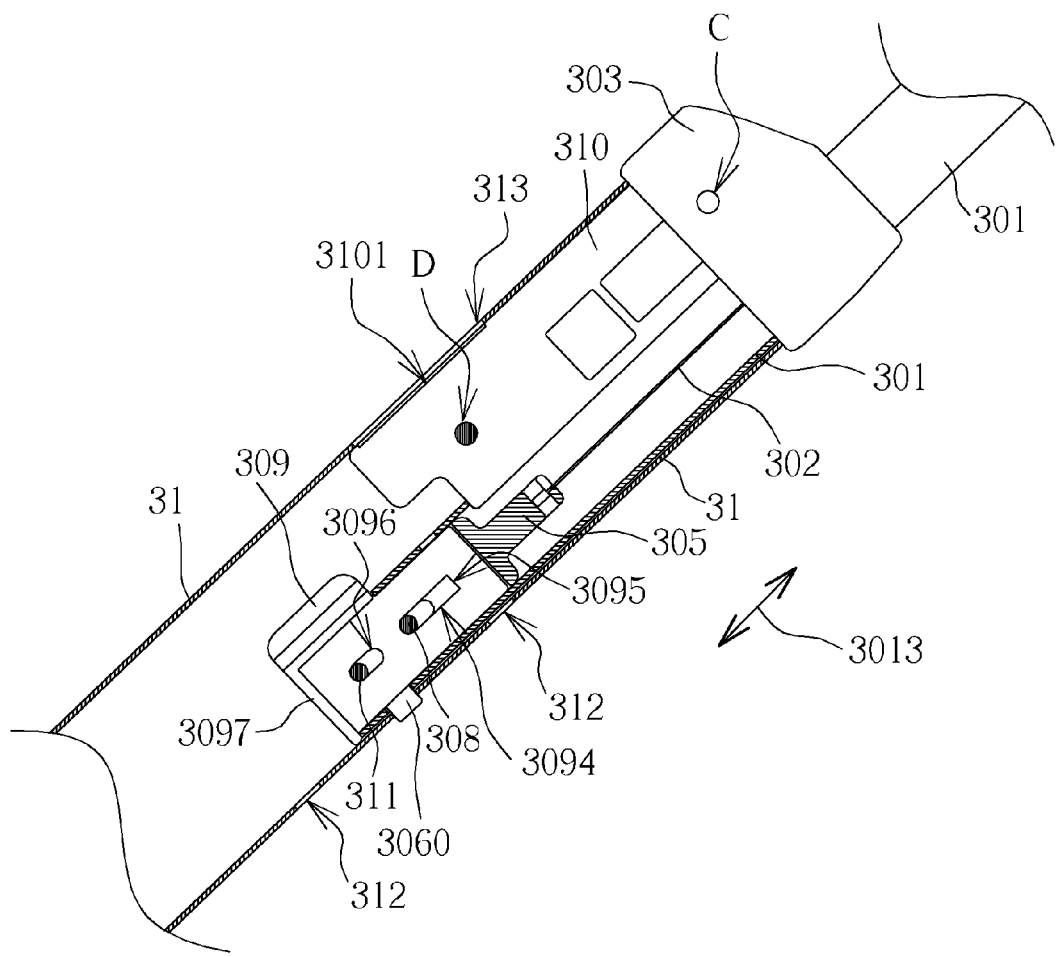

Please refer to FIGS. 2 through 7, which are relevant diagrams of the handle assembly 30 of the child stroller according to the invention. Therein, FIG. 2 is a partial perspective schematic diagram of the handle assembly 30; FIG. 3 is a sectional view of the handle assembly 30 along the line X-X in FIG. 2, illustrating the details of a retraction mechanism of adjusting the lengths of the exposed handle tube 301 of the handle assembly 30; FIG. 4 is an enlarged view of the portion indicated by a label B in FIG. 3, for clearly illustrating the retraction mechanism mentioned above; FIG. 5 is an exploded diagram of the retraction mechanism in FIG. 4 for the handle tube 301; FIG. 6 and FIG. 7 are internal assembly diagrams respectively in different views illustrating the retraction mechanism in FIG. 4, in which the side support assembly 31 and the handle tube 301 are shown with hatch patterns. Furthermore, in FIG. 7, the towing-part holder 305 of the handle assembly 30 is also shown with a hatch pattern.

As shown in FIGS. 2 through 7, the handle assembly 30 includes a one-hand-fold operation assembly 300, a handle tube 301, a towing part 302, a positioning part 303, a towing-part holder 305, a handle-tube engagement part 306, a restore spring 307, a first pin 308, a release part 309, a transition part 310, and a second pin 311. The details of the one-hand-fold operation assembly 300 and the connection of the towing part 302 with the one-hand-fold operation assembly 300 can be realized by use of any skill in the prior art, which is no longer described herein.

As shown in FIG. 4 and FIG. 6, the handle tube 301 is connected to the side support assembly 31 in a slidable way. The towing part 302 and the towing-part holder 305 are engaged with each other, so they are not detached easily. There are a slot 3091 and an opening 3092 formed on the inner wall of the release part 309. The slot 3091 is used for accommodating the restore spring 307 and the handle-tube engagement part 306. An end portion 3061 of the handle-tube engagement part 306 is inserted through the opening 3092 into the slot 3091; then, the towing-part holder 305, the handle-tube engagement part 306, and the release part 309 are pin-jointed by the second pin 311. At this case, the restore spring is compressively disposed in the slot 3091 to bias the handle-tube engagement part 306 toward the opening 3092 so that an end portion 3060 of the handle-tube engagement part 306 can protrude out of the opening 3092. An end of the restore spring 307 pushes an inner wall 3093 of the release part 309, and the other end of the restore spring 307 pushes the surface of the end portion 3061, so as to realize the positioning function of the restore spring 307.

As shown in FIG. 4 and FIG. 7, the first pin 308 passes through a long slot 3094 of the release part 309 and a through hole 3052 of the towing-part holder 305 to joint the release part 309 and the towing-part holder 305 together. The long slot 3094 is used for the first pin 308 to slide on the release part 309 fixed on the handle tube 301, so that the towing-part holder 305 can slide relatively to the release part 309.

When the towing part 302, the towing-part holder 305, the handle-tube engagement part 306, the restore spring 307, the first pin 308, the release part 309, and the second pin 311 are assembled completely, they can be inserted in the handle tube 301 through a notch portion 3011 (shown in FIG. 5) of an end portion 3010 of the handle tube 301 till an engagement part 3095 abuts against the end of the notch portion 3011. Then, the release part 309 is fixed at the end portion 3010 of the handle tube 301 by a pin-joint part at a pin-joint hole 3012.

As shown in FIG. 2, FIG. 4, and FIG. 5, the positioning part 303 and the transition part 310 are pin-jointed with the side support assembly 31 at a point C. A slot 3101 is formed on an upper surface of the transition part 310. Correspondingly, an opening 313 is formed on an upper surface of the side support assembly 31 for a canopy-engaging part 304 of the canopy assembly 39 being inserted in the slot 313 and the slot 3101. Then, the transition part 310, the canopy-engaging part 304, and the side support assembly 31 are pin-jointed at a point D.

Figure 8:
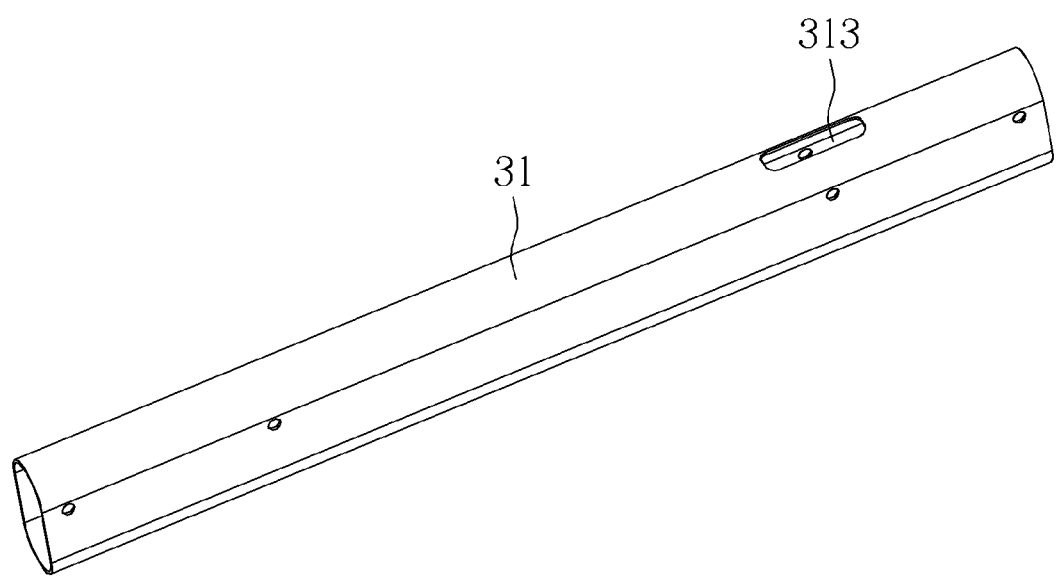
FIG. 8 is a perspective schematic diagram of the side support assembly in FIG. 4.
Figure 9:
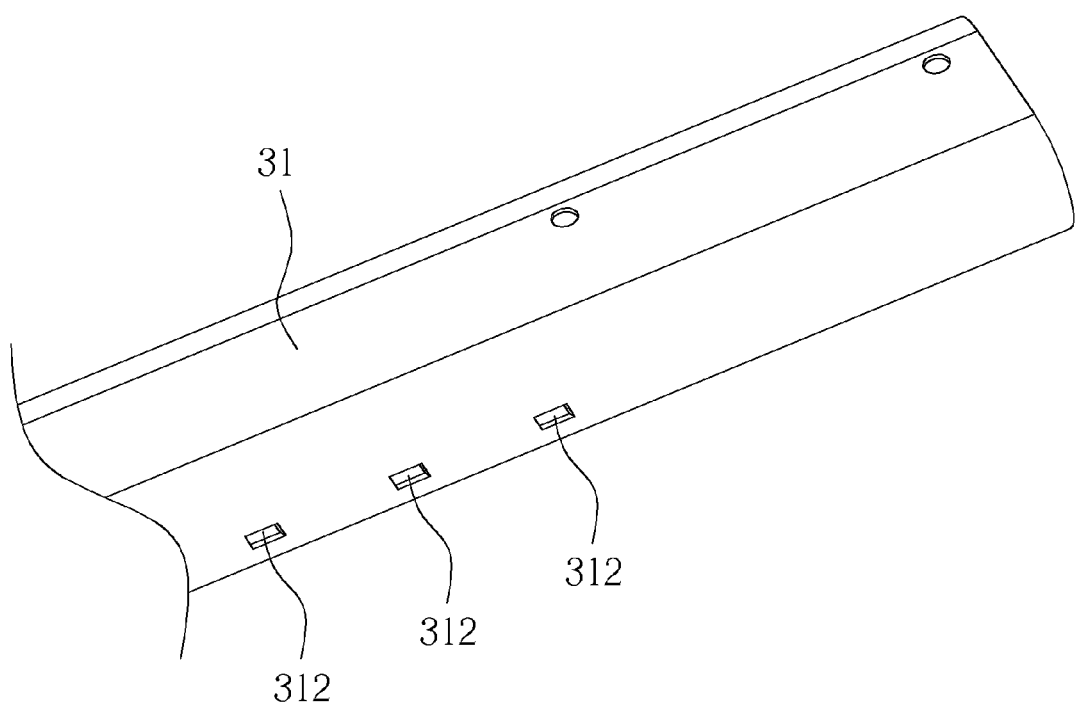
FIG. 9 is a partial perspective schematic diagram of the side support assembly in FIG. 4 in a different view.

As shown in FIG. 4, FIG. 8, and FIG. 9, which are relevant diagrams of the side support assembly 31 of the child stroller according to the invention. Therein, FIG. 8 is a perspective schematic diagram of the side support assembly 31; FIG. 9 is a partial perspective schematic diagram of the side support assembly 31 in a different view. There are the length-adjustment engagement holes 312 on the side support assembly 31 for the handle tube 301. The end portion 3060 of the handle-tube engagement part 306 protruding out of the opening 3092 can be engaged in one of the length-adjustment engagement holes 312 to adjust the length of the handle tube 301 exposed out of the side support assembly 31. In this embodiment, the quantity of the length-adjustment engagement holes 312 is three for example; however, the invention is not limited to it.

As shown in FIG. 4, FIG. 7, and FIG. 9, a sliding direction 3013 is defined, along which the handle tube 301 can move relatively to the slide support assembly 31. The handle-tube engagement part 306 has a slanting slot 3062. The release part 309 has a pin slot 3096. When the release part 309 is assembled to the handle tube 301, the extension direction of the pin slot 3096 is parallel to the sliding direction 3013 of the handle tube 301. The extension direction of the slanting slot 3062 slants relatively to the sliding direction 3013. The second pin 311 passes through the slanting slot 3062, a through hole 3051 of the towing-part holder 305, and the pin slot 3096 to joint the release part 309, the towing-part holder 305, and the handle-tube engagement part 306. If the length of the handle tube 301 exposed out of the side support assembly 31 is desired to be adjusted, the one-hand-fold operation assembly 300 requires being operated to drive the towing part 302 to tow the towing-part holder 305 upward along the sliding direction 3013. At the same time, the second pin 311 moves upward together with the towing-part holder 305; therein, the second pin 311 moves upward along the pin slot 3096. As shown in FIG. 4, the second pin 311 drives the handle-tube engagement part 306 to retract under a guidance effect of the slanting slot 3062 of the handle-tube engagement part 306, so that the end portion 3060 of the handle-tube engagement part 306 is disengaged from the length-adjustment engagement hole 312; that is, the handle-tube engagement part 306 is disengaged from the connection with the side support assembly 31. At this moment, the height adjustment for the handle tube 301 can be performed by also applying a force on the one-hand-fold operation assembly 300 to tow upward or push downward the handle tube 301 during the operation on the one-hand-fold operation assembly 300.

When the height of the handle tube 301 is adjusted to be an expected height and then the hand of a user loosens, the restore spring 307 is driven by the resilient force thereof to push the end portion 3061 of the handle-tube engagement part 306 to move outward. Similarly, the handle-tube engagement part 306 is back to the original position under the guidance effect of the second pin 311 with the slanting slot 3062 and the pin slot 3096. The end portion 3060 of the handle-tube engagement part 306 is engaged in one of the length-adjustment engagement holes 312 again, which realizes re-positioning for the handle tube 301. When the handle-tube engagement part 306 is engaged in one of the length-adjustment engagement holes 312, the handle tube 301 is fixed relatively to the side support assembly 31. As shown in FIG. 7, when a lower end portion 3102 of the transition part 310 touches an upper surface 3098 of the release part 309, the release part 309 can be prevented from departing out.

Figure 10:
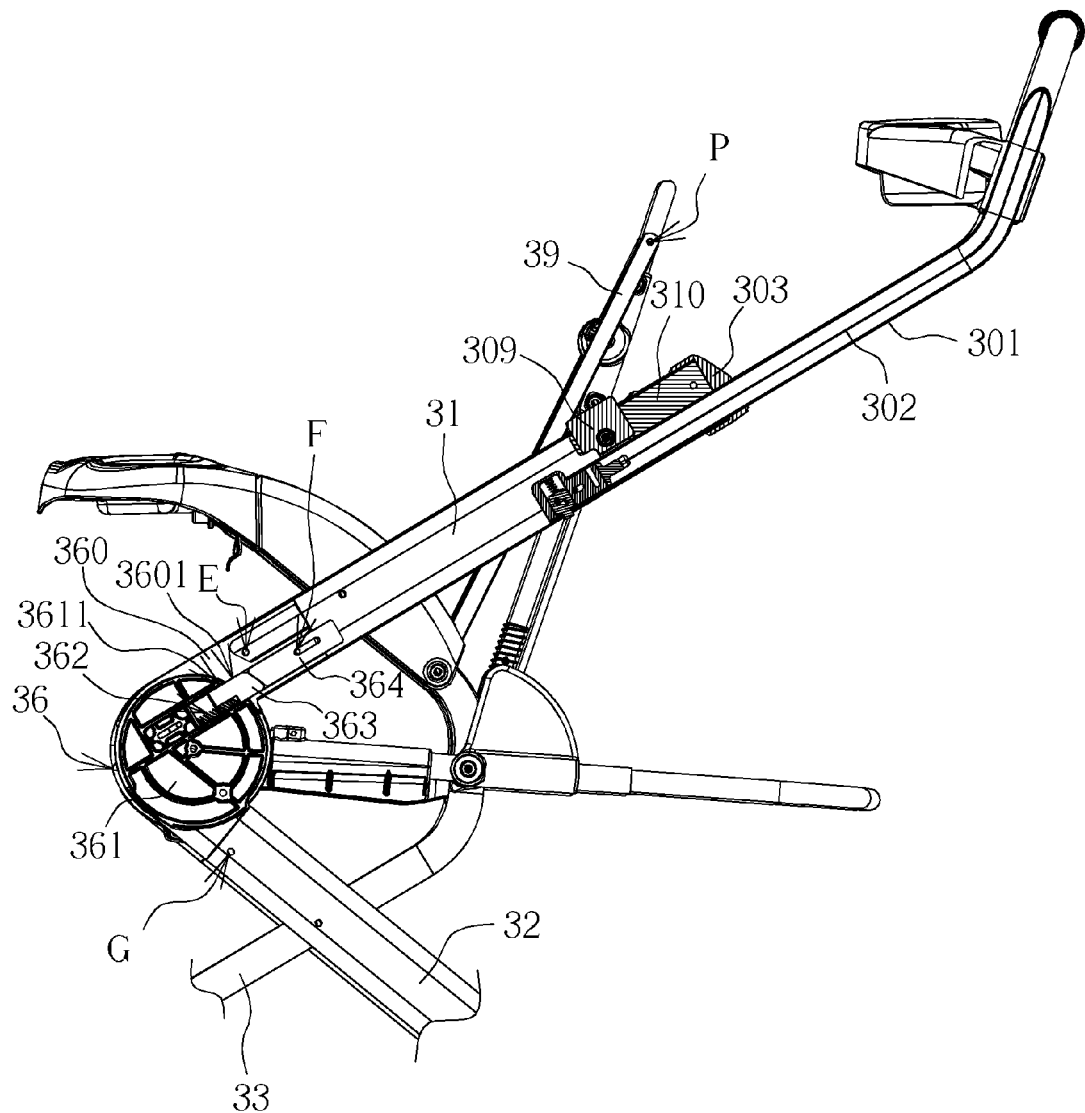
FIG. 10 and FIG. 11 are relevant diagrams illustrating side views of the child stroller partially sectioned in FIG. 1.
Figure 11:
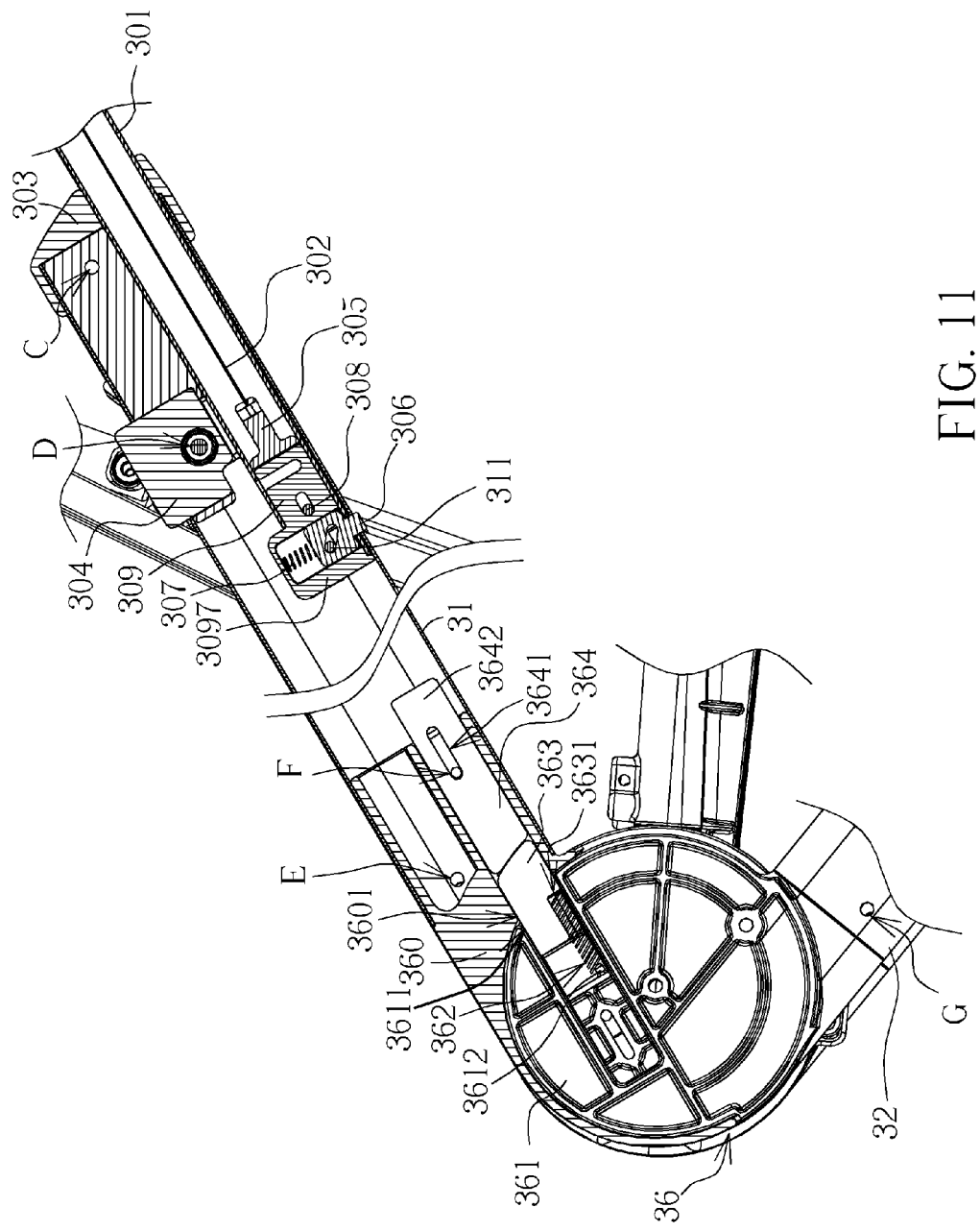

Please refer to FIG. 10 and FIG. 11, which are relevant diagrams illustrating side views of the child stroller partially sectioned. Therein, the side support assembly 31, the handle tube 301, and the frame positioning device 36 are shown with hatch patterns; in FIG. 11, the retraction mechanism of adjusting the lengths of the exposed handle tube 301 is also shown with a hatch pattern. The connection of the side supports assembly 31 and the rear leg assembly 32 is realized by the frame positioning devices 36. The frame positioning device 36 includes a side-support connecting part 360, a rear-leg connecting part 361, a spring 362, an engaging part 363, and a pushing part 364. The side-support connecting part 360 and rear-leg connecting part 361 are pivotally connected. The side-support connecting part 360 and the side support assembly 31 are pin-jointed at a point E. The rear-leg connecting part 361 and the rear leg assembly 32 are pin-jointed at a point G. There is an opening 3611 formed on the rear-leg connecting part 361; correspondingly, there is an opening 3601 formed inside the side-support connecting part 360. The engaging part 363 is capable of moving through the openings 3601 and 3611 respectively. The pushing part 364 is disposed in the side-support connecting part 360 in a slidable way and is also movably jointed to the side-support connecting part 360 at a point F. There is a long slot 3641 formed on the pushing part 364. An end of the spring 362 is jammed on a protrusion 3612 of the rear-leg connecting part 361, and the other end of the spring 362 pushes an inner wall 3631 of the engaging part 363, so as to bias the engaging part 363 toward the opening 3601.

When the child stroller is unfolded and locked, the opening 3601 is substantially aligning with the opening 3611 such that the engaging part 363 moves through the openings 3601 and 3611 to constrain relative rotation between the side-support connecting part 360 and the rear-leg connecting part 361, that is, to lock the side-support connecting part 360 the rear-leg connecting part 361 to keep the child stroller in the unfolded configuration. If the child stroller is desired to be transformed from the unfolded configuration to a folded configuration, the frame positioning device 36 requires being released. Releasing the frame positioning device 36 needs to release the handle assembly 30 first and move the handle tube 301 downward. The handle tube 301 moves toward the frame positioning device 36 till a pushing portion 3097 of the release part 309 pushes a distal portion 3642 of the pushing part 364. If the handle tube 301 moves downward continuously, the pushing portion 3097 of the release part 309 will push the pushing part 364 to move downward; then, the pushing part 364 will push the engaging part 363 to move downward till the engaging part 363 gets rid of the engagement with the opening 3601, so as to release the side-support connecting part 360 and the rear-leg connecting part 361. In the meantime, the frame positioning device 36 is released so that the side support assembly 31 can rotate relatively to the rear leg assembly 32 for folding.

Figure 12:
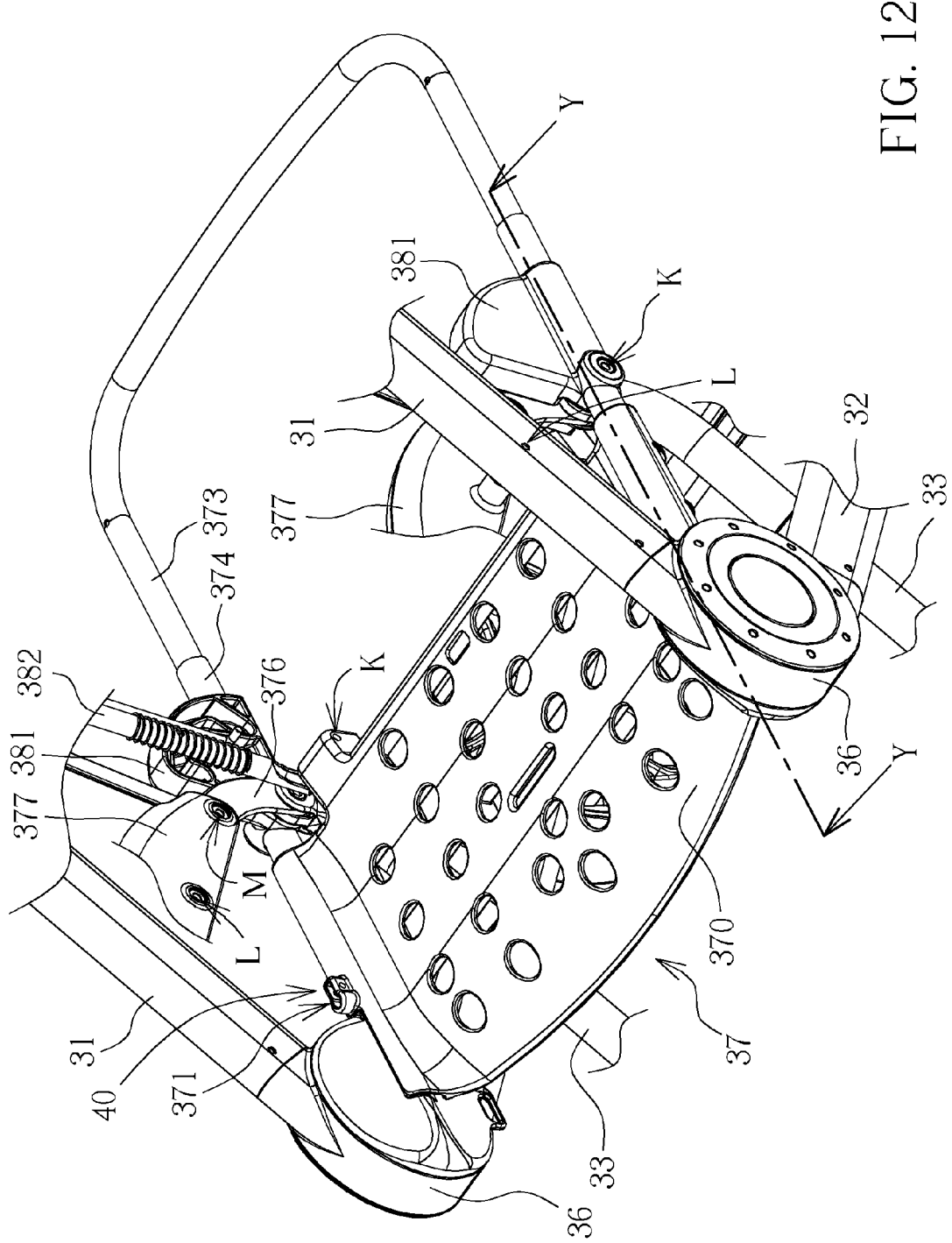
FIG. 12 is a perspective schematic diagram of the chair assembly in FIG. 1.
Figure 13:
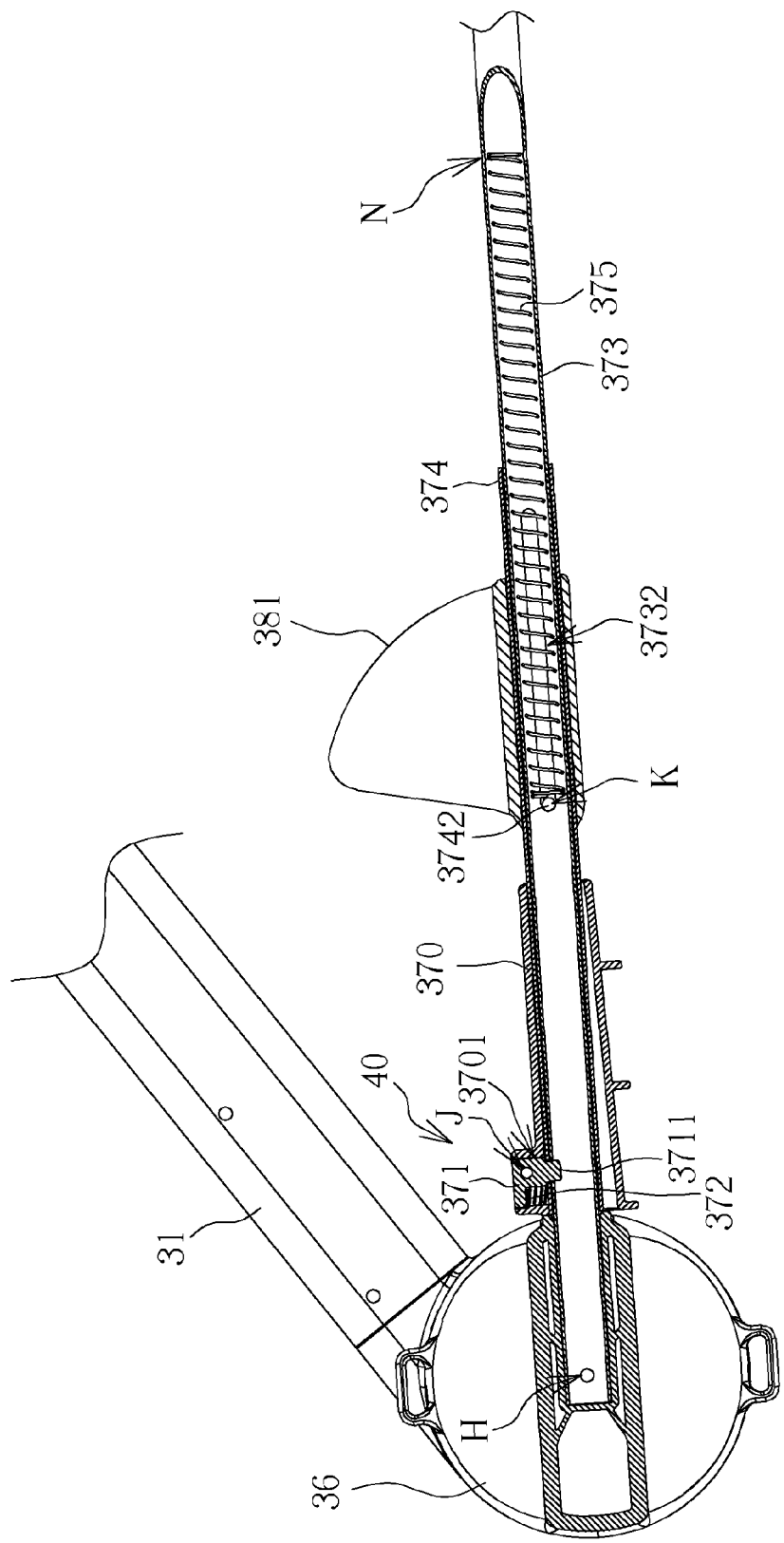
FIG. 13 is a sectional view of the chair assembly along the line Y-Y in FIG. 12.
Figure 14:
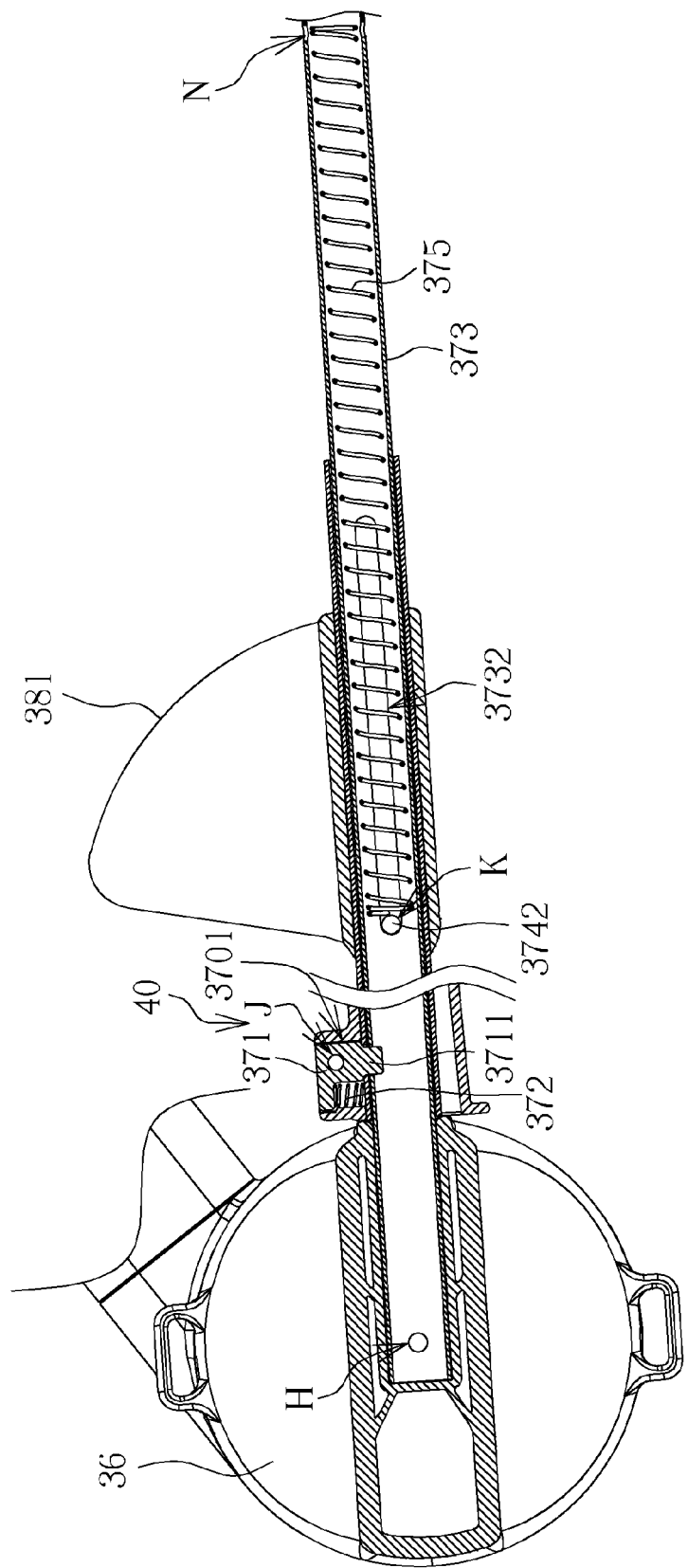
FIG. 14 is a partial enlarged view of FIG. 13.
Figure 15:
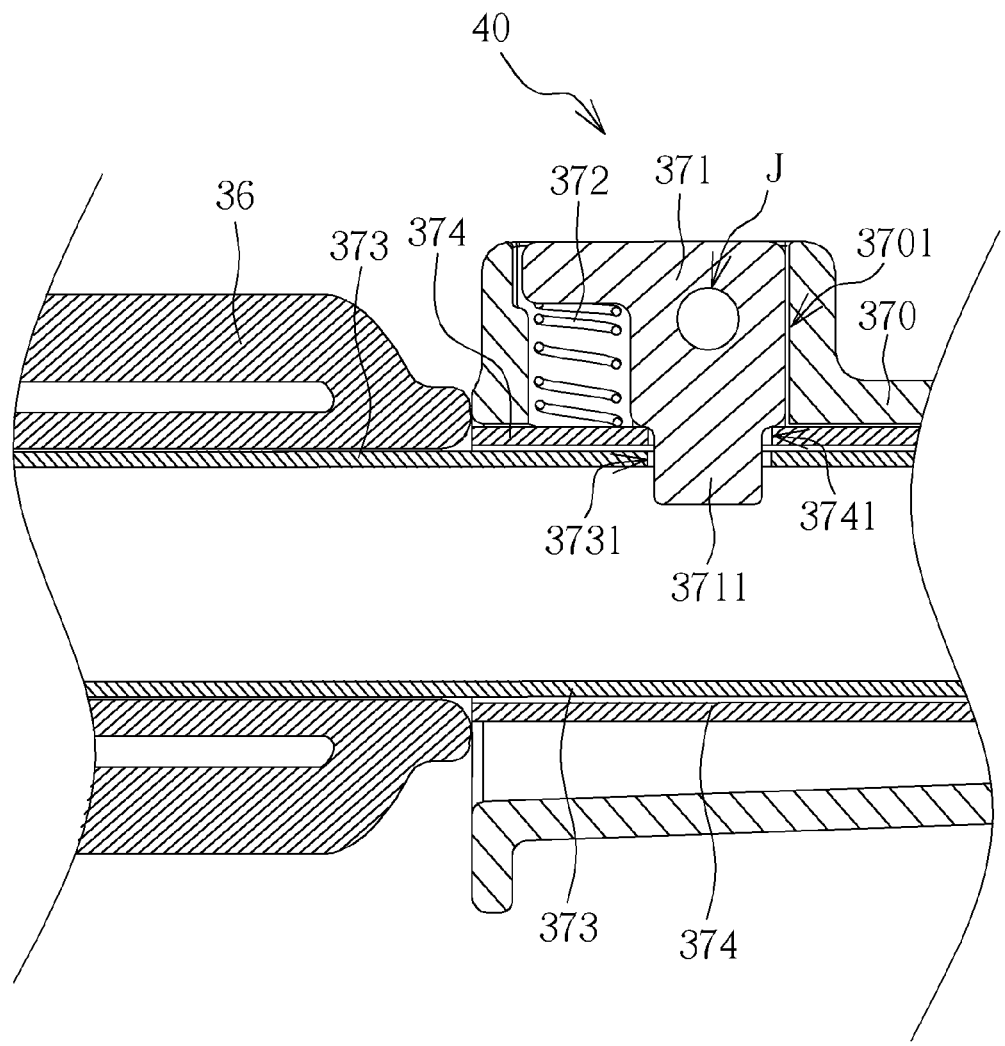
FIG. 15 is a partial enlarged view of the security device of the child stroller according to the invention in FIG. 14.
Figure 16:
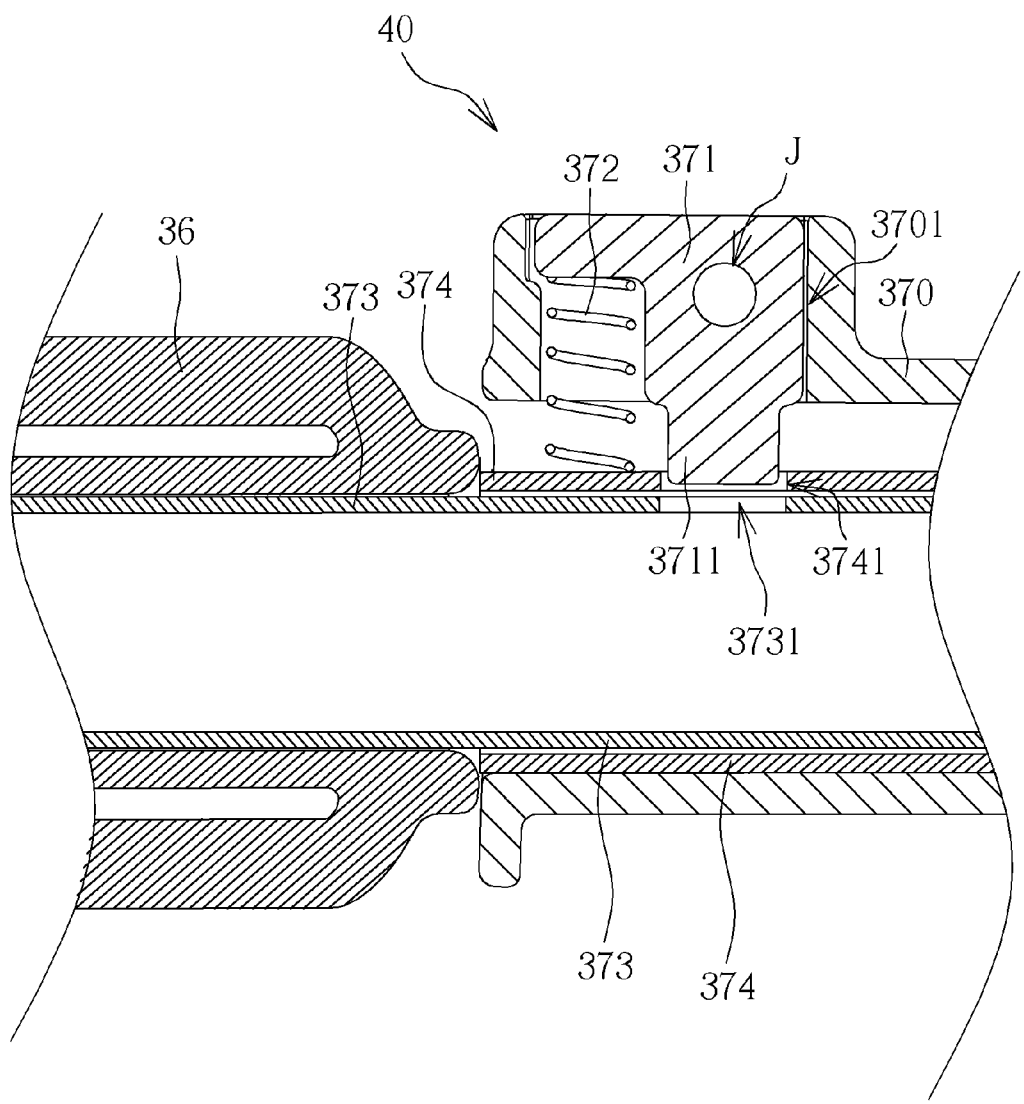
FIG. 16 is a partial enlarged view of the security device in FIG. 15.
Figure 17:
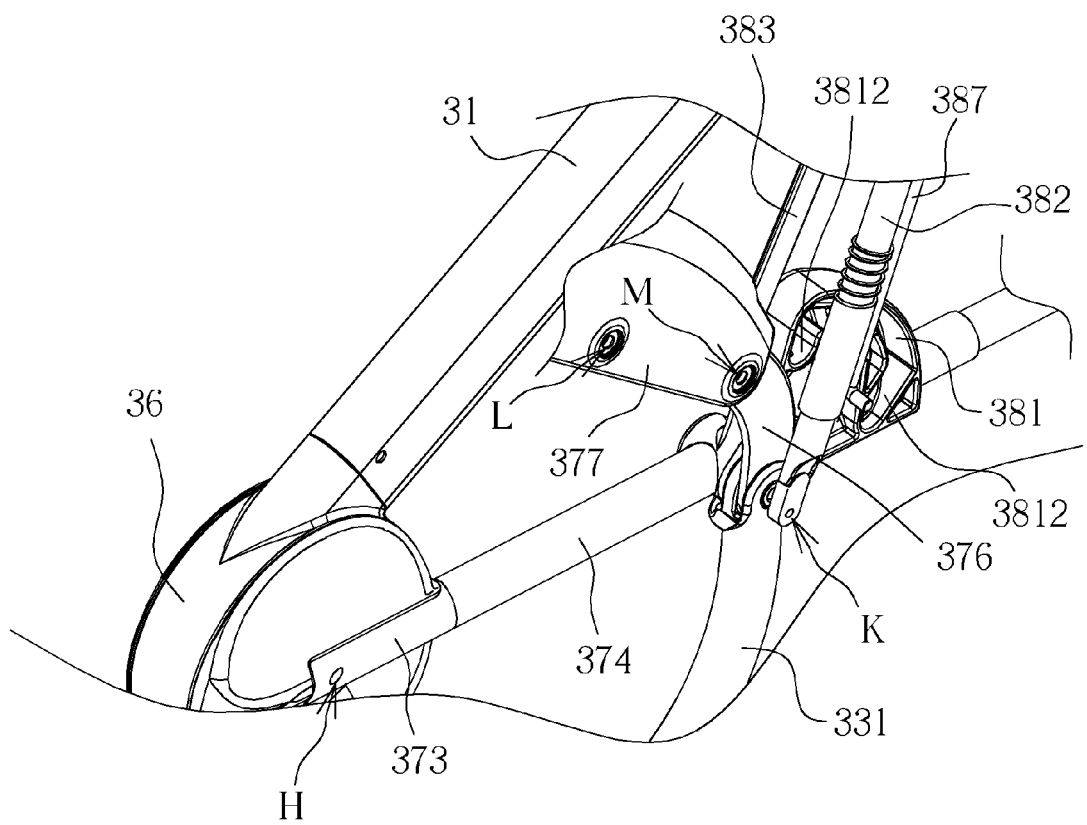
FIG. 17 is a partial enlarged view of FIG. 12.

Please refer to FIGS. 12 through 17, which are relevant diagrams of the chair assembly 37 of the child stroller according to the invention. Therein, FIG. 12 is a perspective schematic diagram of the chair assembly 37; FIG. 13 is a sectional view of the chair assembly 37 along the line Y-Y in FIG. 12; FIG. 14 is a partial enlarged view of FIG. 13; FIG. 15 is a partial enlarged view of the security device 40 of the child stroller according to the invention in FIG. 14, and therein, a seat plate 370 of the chair assembly 37 is locked with seat tubes 373; FIG. 16 is a partial enlarged view of the security device 40 in FIG. 15, illustrating that the seat plate 370 is released from the seat tubes 373; FIG. 17 is a partial enlarged view of FIG. 12, in which the seat plate 370 is hidden.

The chair assembly 37 includes the seat plate 370, the seat tubes 373, linking plates 376, side handrails 377, backrest engaging plastic parts 381, and backrest supporting tubes 382. The security device 40 includes a seat-plate locking part 371, an elastic restore part 372, a sleeve 374, and an auxiliary spring 375. The seat tube 373 is fixed on the frame positioning device 36 at a point H. The seat-plate locking part 371 is fixed on the seat plate 370 at a point J. The sleeve 374 is sleeved on the seat tube 373 in a slidable way and is pivotally connected to the front leg assembly 33 at a point K. The seat plate 370 is disposed on the sleeve 374. The elastic restore part 372 is connected to the seat-plate locking part 371. In this embodiment, the elastic restore part 372 is a spiral spring; however, the invention is not limited to this. For example, rubber springs or other elastic structures are also applicable. The seat plate 370 forms an accommodating space 3701. The seat-plate locking part 371 is disposed in the accommodating space 3701. The elastic restore part 372 is compressively disposed in the accommodating space 3701 and abuts against the seat-plate locking part 371 and the sleeve 374. The sleeve 374 has a first hole 3741. The seat tube 373 has a second hole 3731. When the child stroller is unfolded and locked, the first hole 3741 is aligning with the second hole 3731.

When the child stroller is unfolded and locked, the first hole 3741 is aligning with the second hole 3731. At this moment, when a child is sitting on the seat plate 370, under the weight effect by the child, the seat plate 370 is weighted so that an end portion 3711 of the seat-plate locking part 371 is engaged in the first hole 3741 and the second hole 3731 simultaneously to fix the sleeve 374 and the seat tube 373 together. Because the sleeve 374 cannot move relatively to the seat tube 373, the front leg assembly 33 and the rear leg assembly 32 cannot be folded. Therefore, even if the frame positioning device 36 is released unexpectedly when the child is sitting on the child stroller, the child stroller still cannot be folded so that the child sitting on the seat plate 370 can be protected from getting hurt.

As shown in FIG. 16, when there is no child sitting on the seat plate 370, the seat plate 370 is un-weighted, under the pushing effect by the elastic restore part 372, the seat plate 370 is pushed upward together with the seat-plate locking part 371 so that the seat-plate locking part 371 can be disengaged from the engagement with the seat tube 373. In practice, the seat-plate locking part 371 may be also disengaged from the engagement with the sleeve 374; at this case, the sleeve 374 can move relatively to the seat tube 373. The seat plate 370, the backrest engaging plastic part 381, the sleeve 374, the linking plate 376, a front-leg connecting plastic part 331 of the front leg assembly 33, and the backrest supporting tube 382 are jointed in a slidable way at the point K to be capable of moving relatively to the seat tube 373.

When there is no child sitting on the seat plate 370 and the frame positioning device 36 is released, the child stroller can perform folding. The handle assembly 30 is pushed downward such that the side support assembly 31 is folded toward the rear leg assembly 32. The side support assembly 31 drives the side handrail 377 to rotate around a point L; in the meantime, the linking plate 376 also pivots on a point M, as shown in FIG. 17. Please refer to FIG. 12 and FIG. 13. In the meantime, the backrest engaging plastic part 381, the sleeve 374, the linking plate 376, and the backrest supporting tube 382 move together along the seat tube 373 by the point K so as to drive the front leg assembly 33 and the rear leg assembly 32 to be folded till the folding operation of the child stroller is completed.

It is added that, in this embodiment, the seat-plate locking part 371 is disposed at a side portion 3702 (i.e. the portion above the sleeve 374) of the seat plate 370, so as to reduce the chance of interfering with other components; however, the invention is not limited to it. Furthermore, in this embodiment, the seat plate 370 and the sleeve 374 move together, so the end portion 3711 of the seat-plate locking part 371 is always aligning with the first hole 3741; however, the invention is not limited to it. For example, during the folding of the child stroller, the seat plate 370 does not move with the sleeve 374, and its relative position to the frame positioning device 36 remains unchanged. In the case, the structure of the security device 40 needs to be modified slightly so as to prevent being jammed with the elastic restore part 372 and the sleeve 374. For example, the position of the seat-plate locking part 371 is shifted close to the backrest engaging plastic 381 so that the elastic restore part 372 keeps pushing the sleeve 374 during the movement of the sleeve 374; however, the invention is not limited to it. In addition, in this embodiment, the elastic restore part 372 is compressively disposed between the seat-plate locking part 371 and the sleeve 374; however, the invention is not limited to it. For example, an end of the elastic restore part 372 is connected to the seat-plate locking part 371; the other end of the elastic restore part 372 is fixed on any support extending from the seat tube 373, the sleeve 374, or the frame positioning device 36 so that the end portion 3711 of seat-plate locking part 371 is driven by the compressive resilience of the elastic restore part 372 to be disengaged from the second hole 3731.

As shown in FIG. 14, in this embodiment, there is a long slot 3732 formed on the seat tube 373. The auxiliary spring 375 is accommodated inside the seat tube 373. Two ends of the auxiliary spring 375 push the sleeve 374 and the seat tube 373 respectively. In this embodiment, the sleeve 374 further includes a pin 3742 sliding in the long slot 3732. The auxiliary spring 375 pushes the pin 3742, which realizes the structure pushing the sleeve 374 mentioned above. The seat tube 373 stops the auxiliary spring 375 by a pin or a necking structure, which realizes the structure that the auxiliary spring 375 pushes the seat tube 373 mentioned above. Furthermore, in this embodiment, the pin 3742 can also regarded as the pin for pin-jointing the backrest engaging plastic 381, the sleeve 374, the linking plate 376, and the backrest supporting tube 382, so the position of the pin 3742 is located at the point K; however, the invention is not limited to it.

Therefore, the auxiliary spring 375 is compressed during the folding of the child stroller. In this embodiment, the length of the long slot 3732 is substantially equal to the deformation stroke of the auxiliary spring 375; however, the invention is not limited to it. The deformation stroke of the auxiliary spring 375 can be shorter than the length of the long slot 3732. When the child stroller is unfolded again, the auxiliary spring 375 restores resilience due to being compressed so as to bias the sleeve 374 toward the frame positioning device 36 till the front end of the sleeve 374 abuts against the frame positioning device 36, such that the first hole 3741 and the second hole 3731 are aligning with each other. When the child stroller has been unfolded and a child is sitting on the seat plate 370, the seat-plate locking part 371 is driven by the weight of the child to be engaged again in the first hole 3741 and the second hole 3731 to fix the sleeve 374 and the seat tube 373 together.

Figure 18:
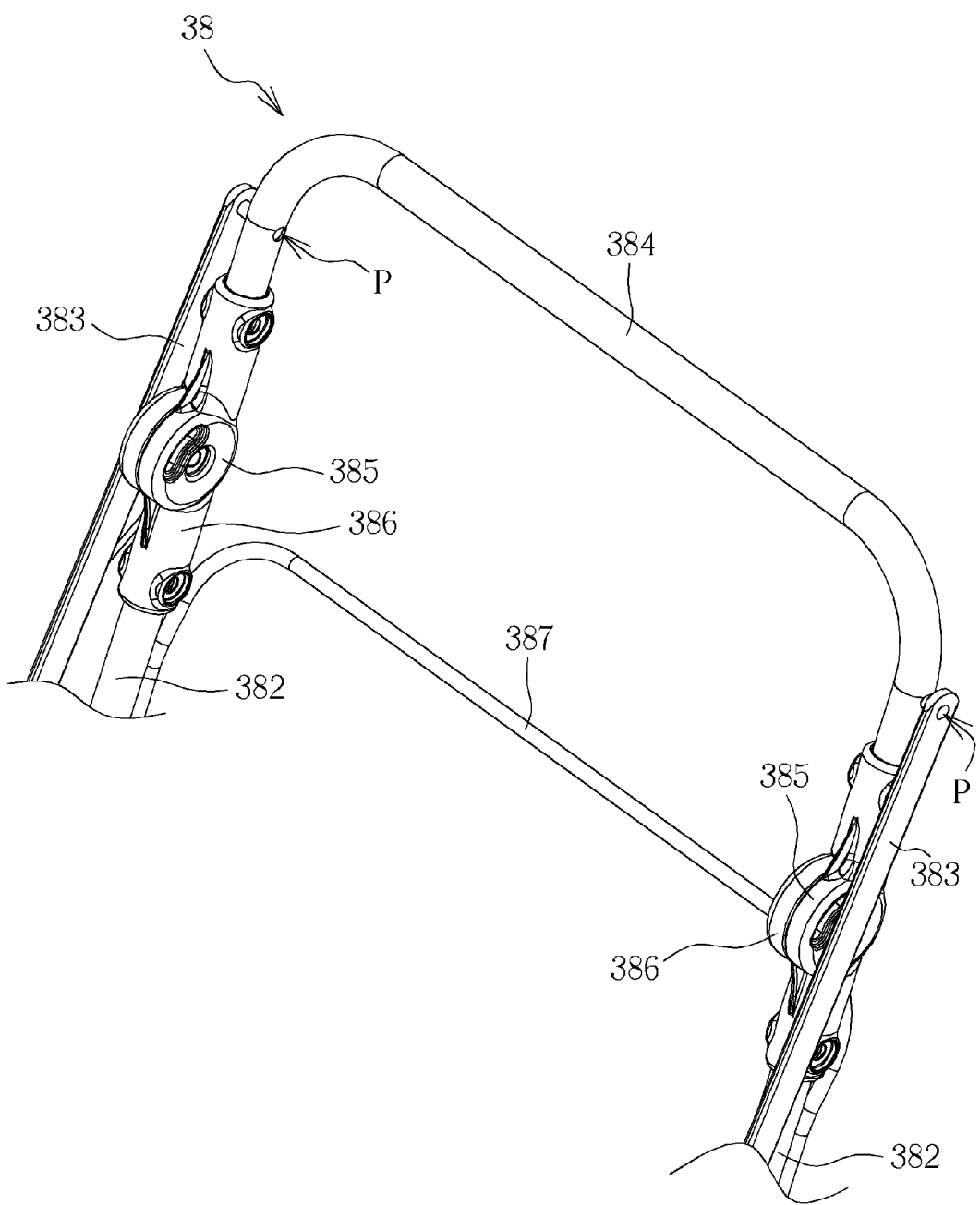
FIG. 18 is a partial enlarged diagram of the backrest assembly in FIG. 1.
Figure 19:
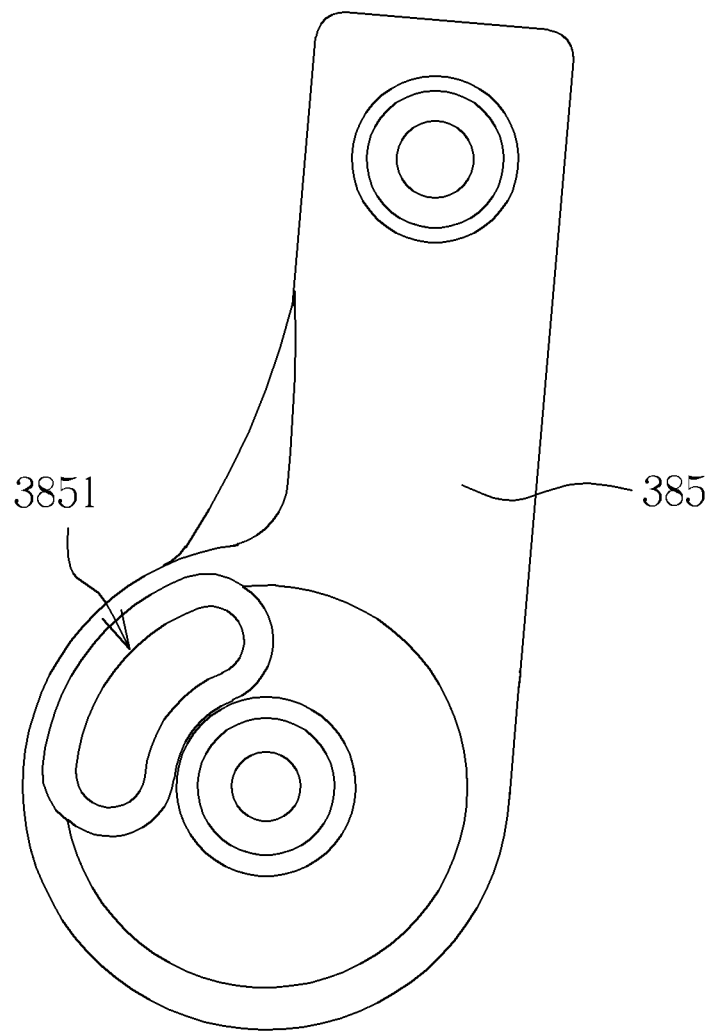
FIG. 19 is a front view of an upper connecting plastic part of the backrest assembly in FIG. 18.

Please refer to FIGS. 17 through 19, which are relevant diagrams of the backrest assembly 38 of the child stroller according to the invention. Therein, FIG. 18 is a partial enlarged diagram of the backrest assembly 38; FIG. 19 is a front view of an upper connecting plastic part 385 of the backrest assembly 38 in FIG. 18. The backrest assembly 38 includes the backrest engaging plastic parts 381, the backrest supporting tubes 382, linking parts 383, a headrest supporting tube 384, upper connecting plastic parts 385, lower connecting plastic parts 386, and a backrest stepwise adjusting wire 387. The backrest engaging plastic part 381 has a plurality of engaging holes 3812; in this embodiment, there are three engaging holes 3812 (one of which is shaded by the backrest supporting tube 382 and not shown in FIG. 17) for the backrest engaging plastic part 381. The backrest supporting tube 382 is selectively engaged in one of the engaging holes 3812 by manipulating the backrest stepwise adjusting wire 387. The other relevant description of the adjustment principle for the backrest assembly 38 can be realized according to the prior art and is not described herein. The headrest supporting tube 384 and the upper connecting plastic parts 385 are fixedly connected. The backrest supporting tubes 382 and the lower connecting plastic parts 386 are fixedly connected. The upper connecting plastic parts 385 and the lower connecting plastic parts 386 are pivotally connected in pairs. In this embodiment, the upper connecting plastic parts 385 at the opposite sides of the stroller frame 3 are located at the right sides of the lower connecting plastic parts 386. However, the invention is not limited to it; in practice, the positions of the connecting plastic parts 385 and 386 can be exchanged. An end of the linking part 383 is pin-jointed with the side handrail 377 at the point M; the other end of the linking part 383 is pin-jointed with the headrest supporting tube 384 at a point P. In this embodiment, the upper connecting plastic part 385 and the lower connecting plastic part 386 are of the same configuration, so FIG. 19 can also be regarded as a schematic diagram of the lower connecting plastic part 386. There is a limit hole 3851 formed on the upper connecting plastic part 385; the lower connecting plastic part 386 also has a limit hole (not shown in the figures because of the views of figures). The angle range of the relative rotation of the upper connecting plastic part 385 and the lower connecting plastic part 386 can be limited by use of a guiding pin passing through the two limit holes, so as to prevent the headrest supporting tube 384 from being excessively rotated.

Figure 24:
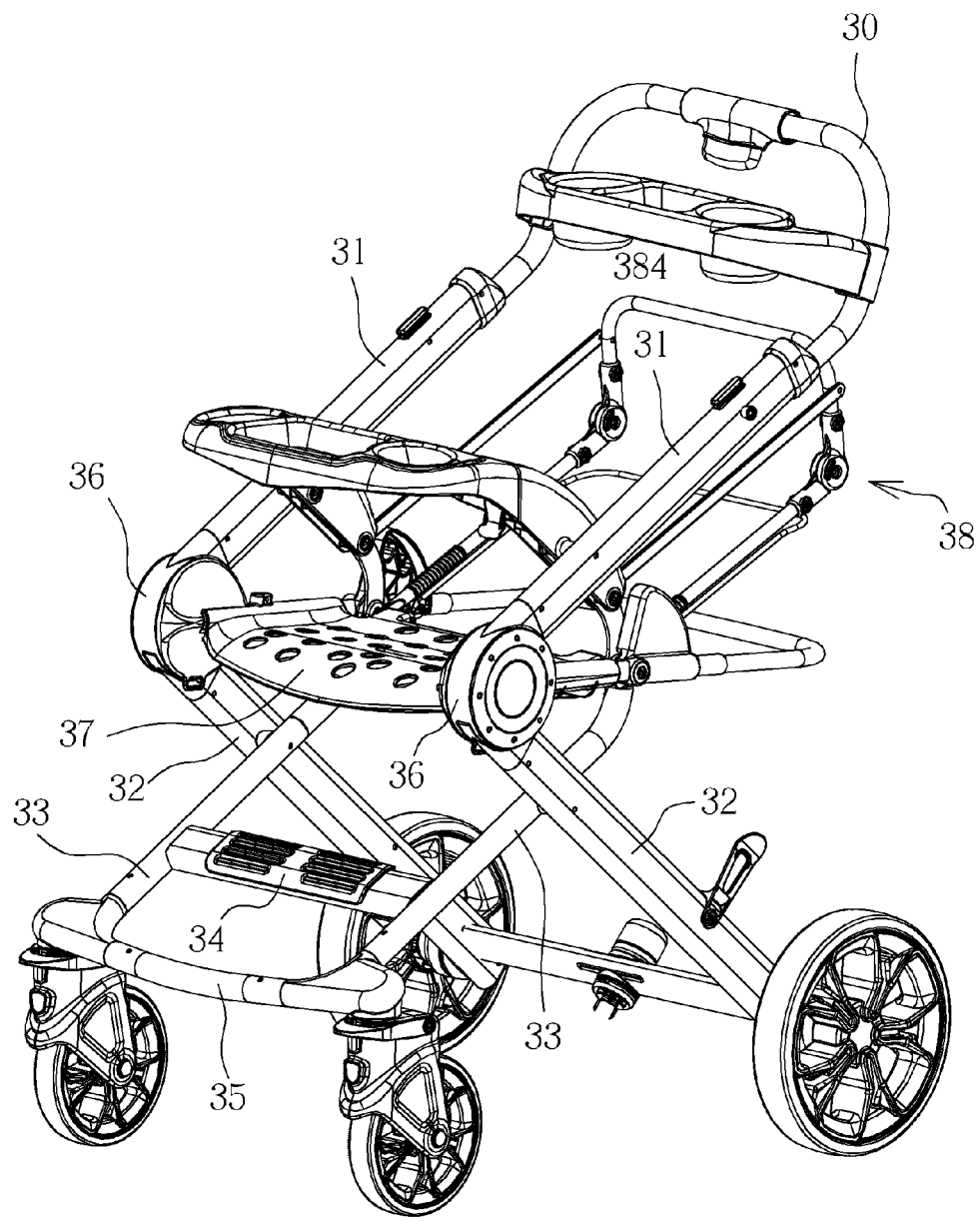
FIG. 24 is a perspective schematic diagram of the child stroller when the handle assembly moves downward to the lowest.

Please refer to FIG. 1 and FIG. 24, illustrating that the backrest assembly 38 is positioned in an upright position and a lying position respectively. When the backrest assembly 38 is in the upright position, the portion of the headrest supporting tube 384 connected to the upper connecting plastic part 385 is substantially parallel to the backrest supporting tube 382. When the backrest assembly 38 is in the lying position, the linking part 383 drives the headrest supporting tube 384 to pivot such that the headrest supporting tube 384 and the cloth (not shown in the figures) can form a protection enclosure providing a safe sleeping space for the child.

Figure 20:
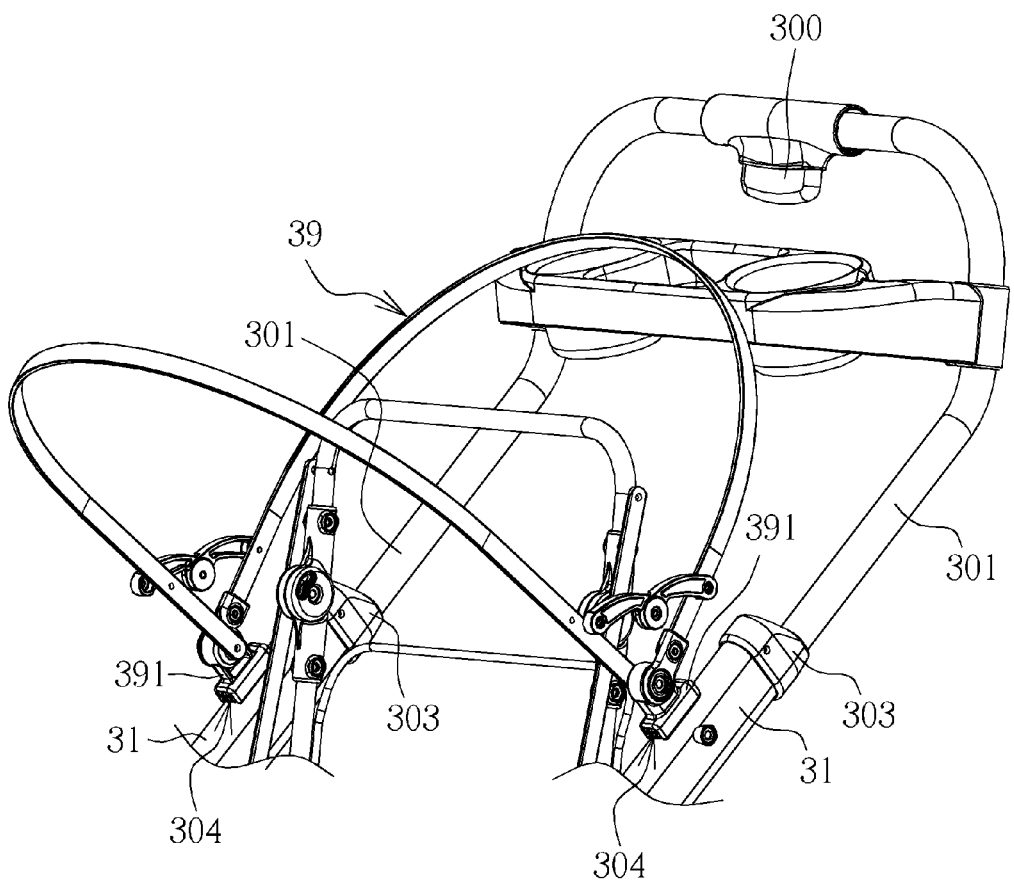
FIG. 20 is a partial perspective schematic diagram of the canopy assembly in FIG. 1.
Figure 21:
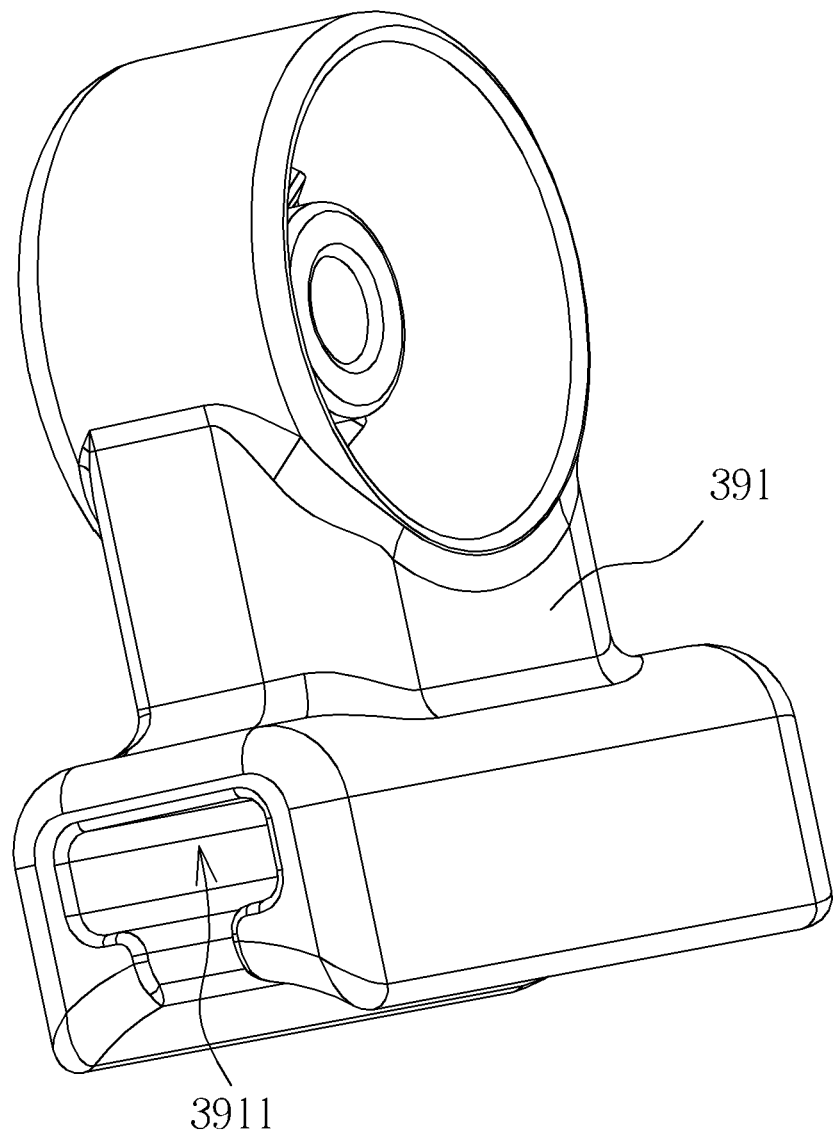
FIG. 21 is a perspective schematic diagram of a canopy holder in FIG. 20.
Figure 22:
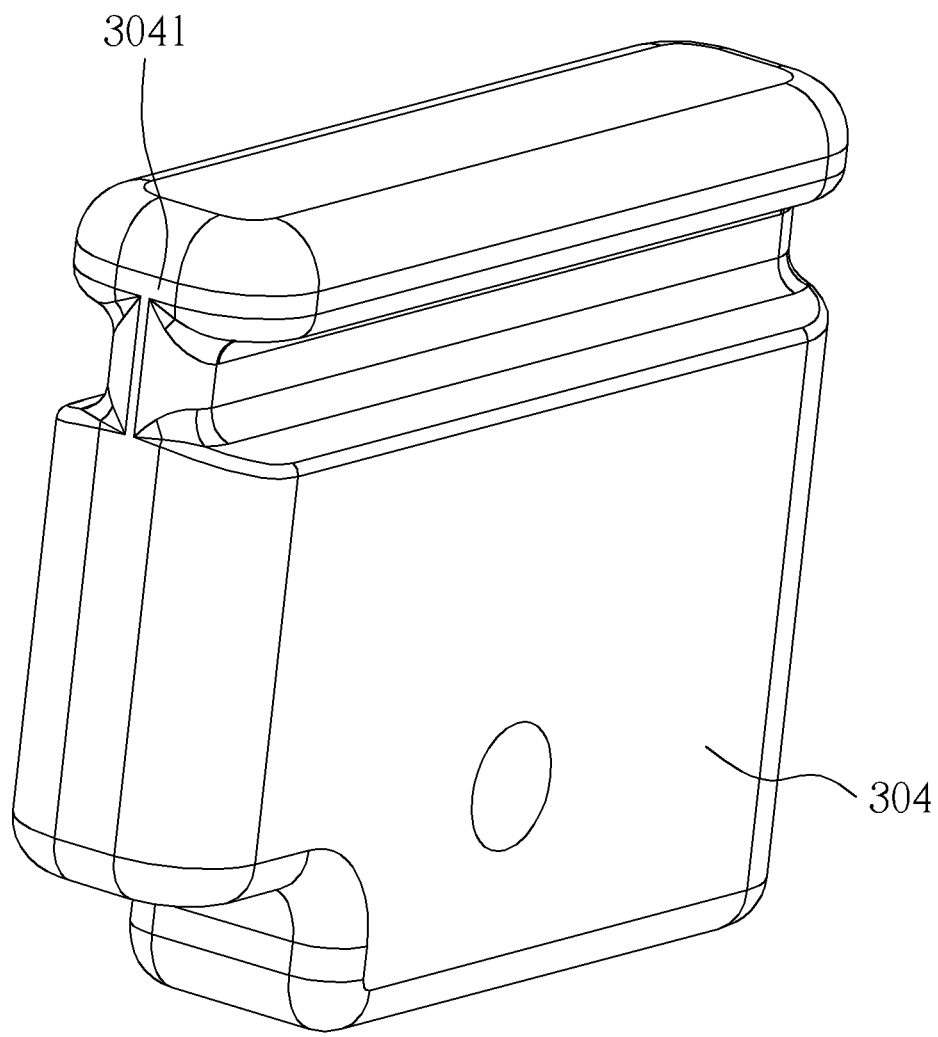
FIG. 22 is a perspective schematic diagram of a canopy-engaging part in FIG. 20.
Figure 23:
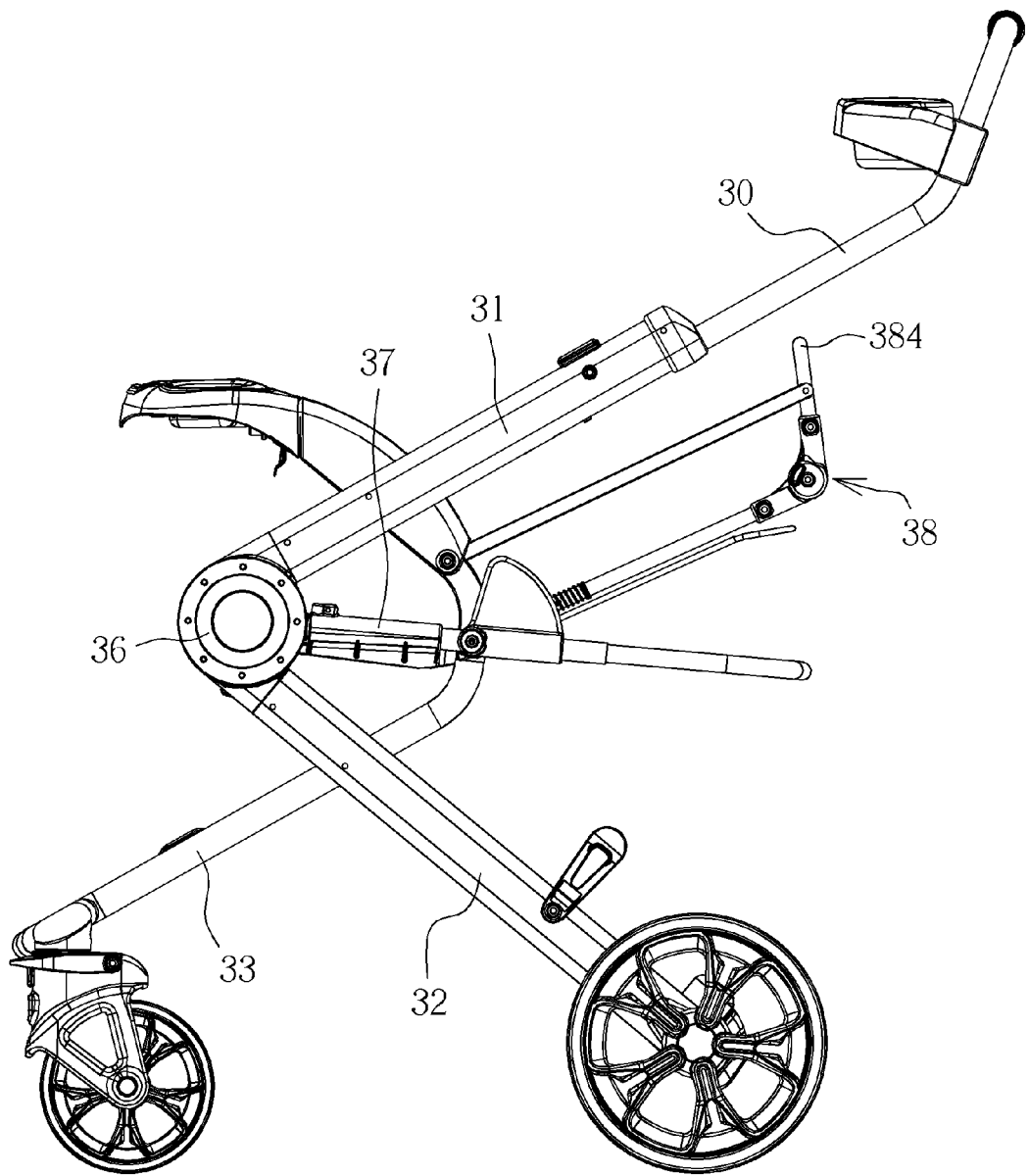
FIG. 23 is a side view of the child stroller when the backrest assembly is adjusted back to the lying position.

Please refer to FIGS. 20 through 22, which are relevant diagrams of the canopy assembly 39 of the child stroller according to the invention. Therein, FIG. 20 is a partial perspective schematic diagram of the canopy assembly 39 in FIG. 1; FIG. 21 is a perspective schematic diagram of a canopy holder 391 in FIG. 20; FIG. 22 is a perspective schematic diagram of a canopy-engaging part 304 in FIG. 20. In this embodiment, the improvement regarding the canopy assembly 39 for the invention is the engagement of the canopy holder 391 with the stroller frame 3. As shown in FIG. 22 and FIG. 23, the canopy holder 391 thereon forms a T-shaped slot 3911; the canopy-engaging part 304 thereon forms a T-shaped slide 3041 correspondingly. When the canopy assembly 39 is mounted on the side support assembly 31 of the stroller frame 3, the T-shaped slide 3041 slides in the T-shaped slot 3911 so that the canopy assembly 39 is engaged with the canopy-engaging part 304 in a detachable way.

Figure 25:
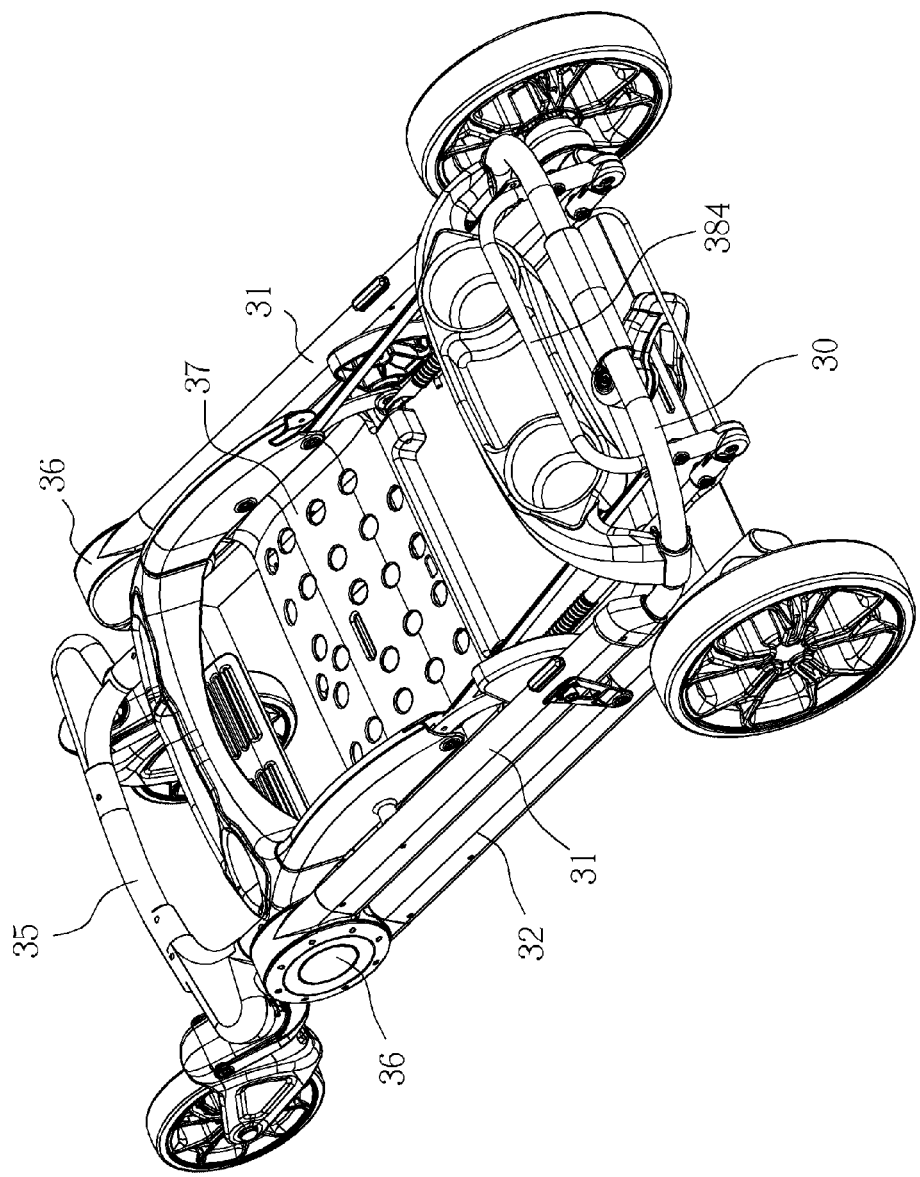
FIG. 25 is a perspective schematic diagram of the child stroller having been folded completely.

Please refer to FIGS. 23 through 25, which are relevant diagrams illustrating the folding of the child stroller according to the invention. Therein, FIG. 23 is a side view of the child stroller when the backrest assembly 38 is adjusted back to the lying position; FIG. 24 is a perspective schematic diagram of the child stroller when the handle assembly 30 moves downward to the lowest; FIG. 25 is a perspective schematic diagram of the child stroller having been folded completely; for simplifying the drawing reading, the canopy assembly 39 is not shown in the figures. When the child stroller is to be folded, in order to prevent interfering during the folding, the backrest assembly 38 can be first adjusted backward for the lying position. Then, the handle assembly 30 is adjusted downward to the lowest so as to release the frame positioning device 36. The child stroller is therefore folded. As shown in FIG. 25, when the child stroller has been folded, the headrest supporting tube 384 is at a proper position for the folding. However, the invention is not limited to it. In practice, even though the backrest assembly 38 is not first adjusted to the lying position, the child stroller can still be folded.

Figure 26:
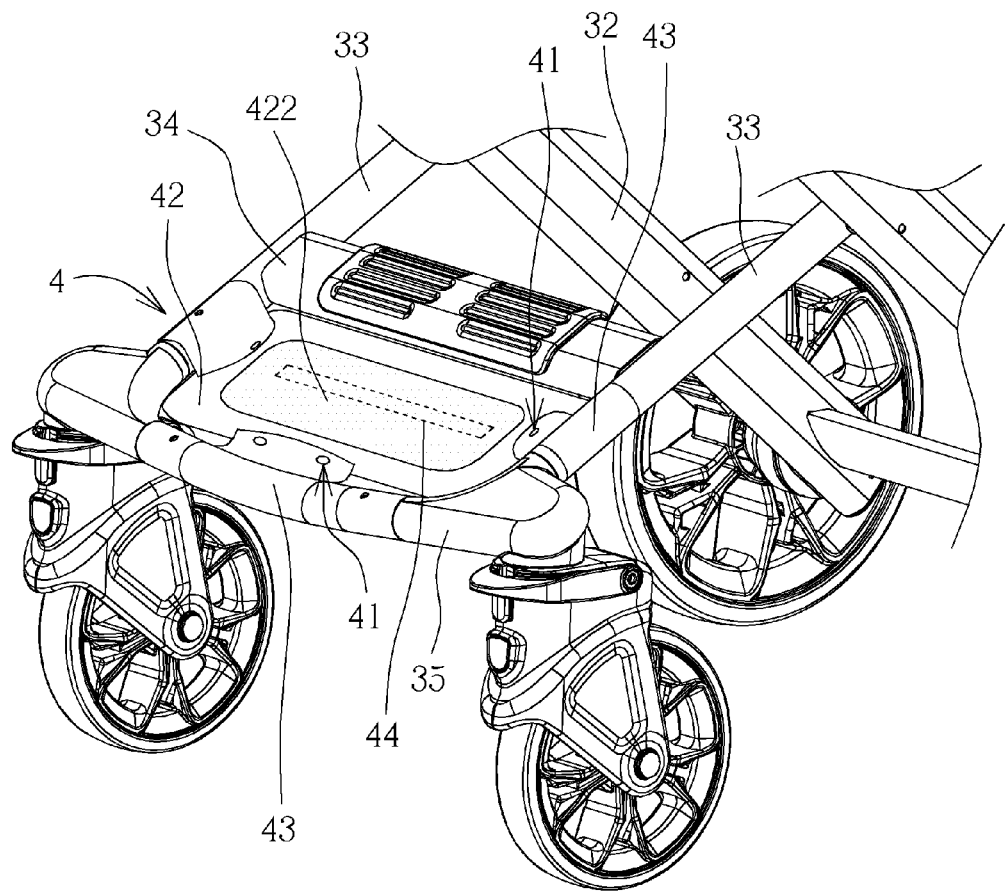
FIG. 26 is a partial perspective schematic diagram of the child stroller having a child shoe storage device.

Please refer to FIG. 26, which is a partial perspective schematic diagram of the child stroller having a child shoe storage device 4 disposed between the front-leg connecting bar 35 and the front cross bar 34. As shown in FIG. 1 and FIG. 26, the child shoe storage device 4 is disposed in the space between the front-leg connecting bar 35 and the front cross bar 34. The child shoe storage device 4 includes fixing buttons 41, a cover 42, connecting pieces 43, and a storage space (not shown in the figure). The cover 42 can includes a transparent sheet 422 for improving the visibility of the storage space. The child shoe storage device 4 has an opening 44 formed by fabric at the bottom thereof. A care giver can put shoes from the bottom into the storage space and see the stuff (such as the above-mentioned shoes) in the storage space through the transparent sheet 422. The child shoe storage device 4 less affects the appearance of the whole child stroller.

In this embodiment, the stroller frame 3 of the child stroller shows a symmetrical structure, so each of the opposite sides of the stroller frame 3 has the security device 40 mainly consisting of the seat-plate locking part 371 and the frame positioning device 36; however, the invention is not limited to it. Compared with the prior art, the child stroller of the invention can protect the child sitting thereon from an unexpected folding of the child stroller by use of the seat-plate locking part 371 of the invention. For example, the unexpected folding may be induced by an unexpected impact on the engaging part 363 by the pushing part 364 during a height adjustment of the handle assembly 30. In other words, the child stroller of the invention is equipped with the frame positioning device 36 and the seat-plate locking part 371, so the child stroller has a function of a double-locking mechanism. The child stroller can be folded only when no child sitting on the child stroller and the frame position device has been released. Therefore, the invention can realize one-hand-fold operation with the requirement of protecting a child thereon from an unexpected folding, which solves the problem in the prior art effectively that a child sitting on a child stroller may get hurt by an unexpected folding.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A security device for preventing unexpected folding for a child stroller, the child stroller comprising a side support assembly, a rear leg assembly, a frame positioning device, a front leg assembly, and a chair assembly, the rear leg assembly and the side support assembly being pivotally connected by the frame positioning device, the front leg assembly and the rear leg assembly being pivotally connected, the chair assembly comprising a seat tube and a seat plate, the seat tube being mounted on the frame positioning device, the security device comprising:

a sleeve, the seat plate being disposed on the sleeve, the sleeve being sleeved on the seat tube in a slidable way and being pivotally connected to the front leg assembly, the sleeve having a first hole, the seat tube having a second hole, the first hole being substantially aligning with the second hole when the child stroller is unfolded;

a seat-plate locking part, movably disposed on the seat plate, the seat-plate locking part having an end portion; and an elastic restore part, connected to the seat-plate locking part, when the first hole is substantially aligning with the second hole and the seat plate is weighted, the end portion being engaged in the first hole and the second hole simultaneously to constrain the sleeve and the seat tube from moving relatively; when the seat plate is un-weighted, the elastic restore part driving the seat-plate locking part to disengage the end portion from the second hole such that the sleeve is capable of moving relatively to the seat tube.

2. The security device of claim 1, wherein the seat plate forms an accommodating space, the seat-plate locking part is disposed in the accommodating space, and the elastic restore part abuts against the seat-plate locking part and the sleeve respectively.

3. The security device of claim 1, further comprising an auxiliary spring, two ends of the auxiliary spring pushing the sleeve and the seat tube respectively to bias the sleeve toward the frame positioning device.

4. The security device of claim 3, wherein the seat tube has a long slot, the sleeve further comprises a pin sliding in the long slot, the auxiliary spring is disposed in the seat tube, and the auxiliary spring pushes the sleeve by the pin.

5. The security device of claim 1, wherein the seat-plate locking part is disposed at a side portion of the seat plate.

6. The security device of claim 1, wherein the end portion of the seat-plate locking part is aligning with the first hole.

7. A child stroller, comprising:
a side support assembly;
a rear leg assembly;
a frame positioning device, the rear leg assembly and the side support assembly being pivotally connected by the frame positioning device;
a front leg assembly, the front leg assembly and the rear leg assembly being pivotally connected;
a chair assembly, comprising a seat tube and a seat plate, the seat tube being mounted on the frame positioning device; and
a security device, comprising:
a sleeve, the seat plate being disposed on the sleeve, the sleeve being sleeved on the seat tube in a slidable way and being pivotally connected to the front leg assembly, the sleeve having a first hole, the seat tube having a second hole, the first hole being substantially aligning with the second hole when the child stroller is unfolded;
a seat-plate locking part, movably disposed on the seat plate, the seat-plate locking part having an end portion; and
an elastic restore part, connected to the seat-plate locking part, when the first hole is substantially aligning with the second hole and the seat plate is weighted, the end portion being engaged in the first hole and the second hole simultaneously to constrain the sleeve and the seat tube from moving relatively, and when the seat plate is un-weighted, the elastic restore part driving the seat-plate locking part to disengage the end portion from the second hole such that the sleeve is capable of moving relatively to the seat tube.

8. The child stroller of claim 7, wherein the seat plate forms an accommodating space, the seat-plate locking part is disposed in the accommodating space, and the elastic restore part abuts against the seat-plate locking part and the sleeve respectively.

9. The child stroller of claim 7, wherein the security device further comprises an auxiliary spring, and two ends of the auxiliary spring push the sleeve and the seat tube respectively to bias the sleeve toward the frame positioning device.

10. The child stroller of claim 9, wherein the seat tube has a long slot, the sleeve further comprises a pin sliding in the long slot, the auxiliary spring is disposed in the seat tube, and the auxiliary spring pushes the sleeve by the pin.

11. The child stroller of claim 7, wherein the seat-plate locking part is disposed at a side portion of the seat plate.

12. The child stroller of claim 7, wherein the end portion of the seat-plate locking part is aligning with the first hole.

13. The child stroller of claim 7, wherein the child stroller comprises a handle assembly, the handle assembly comprises a handle tube, the frame positioning device comprises a side-support connecting part, a rear-leg connecting part, and an engaging part, the side support assembly is mounted on the side-support connecting part, the rear leg assembly is mounted on the rear-leg connecting part, the side-support connecting part and the rear-leg connecting part are pivotally connected, the engaging part is used to lock rotation movement between the side-support connecting part and the rear-leg connecting part, the handle tube is connected to the side support assembly in a slidable way, and the handle tube is capable of moving toward the frame positioning device to push the engaging part so as to unlock the side-support connecting part and the rear-leg connecting part.

14. The child stroller of claim 13, wherein the side-support connecting part and the rear-leg connecting part have a first opening and a second opening respectively, and when the child stroller is unfolded, the first opening is substantially aligning with the second opening such that the engaging part moves through the first opening and the second opening to constrain relative rotation between the side-support connecting part and the rear-leg connecting part.

15. The child stroller of claim 14, wherein the frame positioning device further comprises a pushing part, the pushing part is disposed in the side-support connecting part in a slidable way, and when the handle tube moves toward the frame positioning device to push the pushing part, the pushing part pushes the engaging part to unlock the side-support connecting part and the rear-leg connecting part.

16. The child stroller of claim 13, wherein the side-support connecting part and the rear-leg connecting part have a first opening and a second opening respectively, the engaging part is capable of moving in the first opening and the second opening, the frame positioning device further comprises a spring, and two ends of the spring push the engaging part and the side-support connecting part for biasing the engaging part toward the first opening.

17. The child stroller of claim 13, wherein the side support assembly comprises a plurality of length-adjustment engagement holes, the handle assembly further comprises an operation assembly, a towing part, a towing-part holder, a handle-tube engagement part, and a release part, the release part is disposed at an end portion of the handle tube, the handle tube is capable of pushing the engaging part of the frame positioning device by the release part to unlock the side-support connecting part and the rear-leg connecting part, the towing part connects the operation assembly and the towing-part holder, the towing-part holder and the handle-tube engagement part are connected such that the handle-tube engagement part is capable of being driven to be engaged in or disengaged from one of the length-adjustment engagement holes, and when the handle-tube engagement part is engaged in one of the length-adjustment engagement holes, the handle tube is fixed relatively to the side support assembly.

18. The child stroller of claim 17, wherein the handle assembly further comprises a restore spring, the release part has a slot and an opening, the handle-tube engagement part is disposed in the slot, the handle-tube engagement part has an end portion, the end portion of the handle-tube engagement part protrudes out of the opening of the release part so as to be engaged in one of the length-adjustment engagement holes, and the restore spring is compressively disposed in the slot to bias the handle-tube engagement part toward the opening of the release part.

19. The child stroller of claim 17, wherein a sliding direction is defined, the handle tube is capable of moving along the sliding direction relatively to the side support assembly, the handle-tube engagement part has a slanting slot, the release part has a pin slot, an extension direction of the pin slot is substantially parallel to the sliding direction, an extension direction of the slanting slot slants relatively to the sliding direction, the handle assembly further comprises a pin, the handle-tube engagement part, the release part, and the towing-part holder are pin-jointed by the pin, and the pin passes through the slanting slot and the pin slot such that the towing-part holder is capable of driving the handle-tube engagement part to be engaged in or disengaged from one of the length-adjustment engagement holes by the pin.

20. The child stroller of claim 13, further comprising a backrest assembly, the backrest assembly comprising a backrest engaging plastic part, a backrest supporting tube, and a headrest supporting tube, the backrest engaging plastic part being disposed on the sleeve and having a plurality of engaging holes, the backrest supporting tube being selectively engaged in one of the engaging holes, the backrest supporting tube being pivotally connected to the headrest supporting tube, wherein the headrest supporting tube rotates relatively to the backrest supporting tube during an adjustment of the backrest supporting tube from a upright position to a lying position.

21. The child stroller of claim 20, wherein the backrest assembly further comprises a linking part, two ends of the linking part are pivotally connected to the sleeve and the headrest supporting tube respectively.

22. The child stroller of claim 21, wherein the linking part is pivotally connected to a linking plate, and the linking plate is pivotally connected to the sleeve.

23. The child stroller of claim 20, wherein the headrest supporting tube and the backrest supporting tube are connected to a couple of upper connecting plastic parts and a couple of lower connecting plastic parts respectively, and the upper connecting plastic part and the lower connecting plastic part are pivotally connected to each other correspondingly.

24. The child stroller of claim 23, wherein the upper connecting plastic part and the lower connecting plastic part respectively have a limit hole, a pin passes through the limit holes of the upper connecting plastic part and the lower connecting plastic part so as to limit a rotation range of the upper connecting plastic part and the lower connecting plastic part.

25. The child stroller of claim 13, further comprising a canopy assembly, the canopy assembly comprising a canopy holder and a canopy-engaging part, the canopy-engaging part being disposed on the side support assembly, the canopy holder being movably disposed on the canopy-engaging part.

26. The child stroller of claim 7, wherein the front leg assembly comprises a front-leg connecting bar, a front cross bar, and a storage device, and the storage device is disposed between the front-leg connecting bar and the front cross bar.

27. The child stroller of claim 26, wherein the storage device has an opening, and the opening is disposed at a bottom of the storage device.

* * * * *